United States Patent [19]
Fujii et al.

[11] Patent Number: 5,381,167
[45] Date of Patent: Jan. 10, 1995

[54] COLOR IMAGE FORMING APPARATUS

[75] Inventors: Yozo Fujii; Tadashi Miwa; Hisao Satoh; Atsushi Ogane; Isao Matsuoka; Tadayoshi Ikeda, all of Hachioji, Japan

[73] Assignee: Konica Corporation, Tokyo, Japan

[21] Appl. No.: 962,862

[22] Filed: Oct. 19, 1992

[30] Foreign Application Priority Data

| Oct. 24, 1991 | [JP] | Japan | 3-277948 |
| Oct. 24, 1991 | [JP] | Japan | 3-277949 |
| Oct. 24, 1991 | [JP] | Japan | 3-277950 |
| Oct. 24, 1991 | [JP] | Japan | 3-277980 |

[51] Int. Cl.$^6$ .................. G03G 15/01; G01D 15/14
[52] U.S. Cl. .................. 346/157; 346/160; 355/326 R
[58] Field of Search .............. 346/157, 160; 355/326-328

[56] References Cited

U.S. PATENT DOCUMENTS

| 4,903,067 | 2/1990 | Murayama et al. | 346/160 |
| 4,912,491 | 3/1990 | Hoshino et al. | 346/160 |
| 4,965,597 | 10/1990 | Ohigashi et al. | 346/157 |
| 5,160,946 | 11/1992 | Hwang | 346/157 |
| 5,200,285 | 4/1993 | Carrish | 346/157 X |
| 5,241,400 | 8/1993 | Itagaki | 346/157 X |

FOREIGN PATENT DOCUMENTS

| 95361 | 6/1983 | Japan . |
| 75850 | 4/1985 | Japan . |
| 76766 | 5/1985 | Japan . |
| 95456 | 5/1985 | Japan . |
| 95458 | 5/1985 | Japan . |
| 158475 | 8/1985 | Japan . |

Primary Examiner—George H. Miller, Jr.
Attorney, Agent, or Firm—Finnegan, Henderson Farabow, Garrett & Dunner

[57] ABSTRACT

A color image forming machine includes a plurality of exposure units for irradiating an image carrier movable in a secondary scanning direction of the exposure units by primary scanning beams, at a plurality of irradiation positions to form latent images, a plurality of charging units for charging the image carrier corresponding to the irradiation positions of the exposure units and a plurality of developing units to form toner images corresponding the latent images. The plurality of toner images are superimposed on the image carrier to obtain a multi-color or full-color images trough transferring and fixing. A light-reflective registration mark is provided to a non-image area on one side of the image carrier. Employing at least two exposure units, irradiation by each primary scanning beam is conducted to the light-reflective registration mark moving in the secondary scanning direction. Each reflected beam from the registration mark is received by a plurality of photoreceptor sensors and then detection signals of a registration mark position are generated. Timing of writing by the primary scanning beam and a distance between bright lines formed on the image carrier by primary scanning beams of at least two exposure units are detected. The detected result is fed back to control the start timing of image writing and the driving of the image carrier.

6 Claims, 26 Drawing Sheets

COLOR IMAGE FORMING APPARATUS

BACKGROUND OF THE INVENTION

The present invention relates to a color image forming apparatus wherein a toner image is formed on an image forming member in an electrophotographic method and the toner image is then transferred onto a transfer material so that an image may be obtained.

As an image forming method for obtaining a color image through an electrophotographic method, there have been known methods wherein latent images corresponding in quantity to the number of separated colors of an image on a document are formed and developed repeatedly on an image forming member to be super imposed thereon, and then the superimposed color toner images are transferred so that a color image may be obtained, as disclosed in Japanese Patent Publication Open to Public Inspection Nos. 75850/1985, 76766/1985, 95456/1985, 95458/1985 and 158475/1985 (hereinafter referred to as Japanese Patent O.P.I. Publication), for example.

The first example of a color image forming apparatus employing an image forming method wherein latent images corresponding in quantity to the number of separated colors of an image on a document read by a color scanner are formed and developed repeatedly on an image forming member is represented by one wherein exposure units and developing units each corresponding in quantity to the number of separated colors (for example, 3 colors of yellow, magenta and cyan or 4 colors including also black) are provided around a belt-shaped image forming member. A second example thereof is represented by one wherein exposure units and developing units each corresponding in quantity to the number of colors are provided around a drum-shaped image forming member. A color image forming apparatus equipped with the belt-shaped image forming member will be explained as follows.

In the color image forming apparatus, a belt-shaped image forming member comprising a flexible belt on which photoconductive substances are coated or evaporated is spread over tension rollers so that the flexible belt may rotate while staying in contact with a guide member representing a reference position, with the help of tension caused by pressure-contact with the tension rollers. Thus, the surface of the belt-shaped image forming member is moved in the direction of the surface while the surface is kept constantly at a certain position in the direction perpendicular to that surface. Owing to the manner mentioned above, image forming means including a charging unit, an exposure unit and a plurality of developing units each containing different color toner (yellow, magenta, cyan and black) provided around the belt-shaped image forming member, can keep a fixed distance from the belt-shaped image forming member when it rotates.

With regard to the speed of a photoreceptor in a color image-forming apparatus, the speed of a motor for driving a photoreceptor is controlled, by means of a servo technology known widely, to be at a predetermined constant speed.

However, even when a photoreceptor-driving motor is controlled to be at a predetermined constant speed, the speed of the surface of the photoreceptor itself is not necessarily at the speed set in advance. For example, when a drum is used for a photoreceptor, the speed of the surface of the photoreceptor varies when a diameter of the drum changes, despite the constant speed of the photoreceptor-driving motor. Further, when a photoreceptor belt is used, the moving speed of the photoreceptor varies depending on the variation in diameters of belt-driving rollers and in belt thickness.

That is, when a photoreceptor drum, a photoreceptor belt or a belt-driving roller is replaced in the case of maintenance or the like, the speed of the surface of the photoreceptor varies because of variation in terms of dimension of replaced items.

In systems having photoreceptor drum or in multi-rotation systems, there is no such problem. When a photoreceptor belt is used, however, the variation in belt thickness and in diameters of belt-driving rollers cause a problem in that superimposed images slip in the secondary scanning direction.

Namely, a plurality of image writing units are positioned at predetermined intervals and they are controlled to start writing images successively with a delay of a predetermined period of time as an image position moves from the upstream side on a photoreceptor belt so that images may be superimposed. When a moving speed of the photoreceptor belt changes, moving time of an image position is changed. Therefore, even when image writing units are controlled to start writing images successively with a delay of a predetermined period of time, a position to start writing images on the photoreceptor belt sometimes has passed the exposure point, or has not reached the exposure point.

Further, on an ordinary image forming apparatus, the speed of rotation of a motor for driving a conveyance system is controlled so that the speed of a transfer sheet may be the same as that of a photoreceptor belt to avoid image disturbance. When a moving speed of the photoreceptor belt varies, however, speed difference still takes place and images are disturbed (i.e., so-called "transfer slip" takes place).

In a conventional method for solving the problem mentioned above, a photoreceptor belt is provided on its circumference with a large number of slits which are read by a photocoupler or the like, so that the speed of the photoreceptor belt itself may be controlled to be constant by signals read by the photocoupler or the like. In this case, however, an exclusive photocoupler is needed, resulting in disadvantages in the aspects of space and cost.

From the viewpoint of an image writing unit, on the other hand, those positioned at predetermined intervals tend to be displaced in terms of intervals when temperature changes. This phenomenon is usually caused by thermal expansion of a plate on which image writing units are positioned. For example, when an interval for positioning of writing units is 15 mm, it corresponds to a distance of 450 mm between the first color and the fourth color which results in the interval change of about 0.1 mm with temperature change of 20° C.

Thus, an image of each color is deviated by the temperature change of 20° C., when the writing of each image is only controlled to start with a delay of predetermined period of time.

On a color image forming apparatus wherein a plurality of toner images (Y, M, C, K) are superimposed on an image forming member for forming a color toner image, when an exposure-start position on the belt-shaped photoreceptor mentioned above cannot be set with a deviation of less than or equal one pixel unit, about 80 μm for example, from a plurality of exposure units, image quality of a color toner image deteriorates has been a problem. Especially, when a belt-shaped image forming member is used, control of image registration has been difficult, compared to that of a drum-shaped image forming member.

To prevent color slip in the secondary scanning direction in a color image forming apparatus, there is considered a method wherein each latent image can be formed from the same point on an image forming member by establishing a registration mark on the image forming member, detecting the registration mark with a photo-coupler and by causing a plurality of exposure units to start exposure in succession based on the detected signals.

In the color image forming apparatus mentioned above, however, a photo-coupler and an exposure unit need to be positioned extremely precisely and exposure units also need to be positioned at accurate intervals (accuracy of about ±0.01–0.1 mm) although a registration mark established on a belt-shaped image forming member is read by a single photo-coupler or by a plurality of photo-couplers and timing for start exposure of each exposure unit is determined accordingly. Actually, it has been difficult to position a plurality of sensors and exposure units with positional intervals which are extremely accurate mechanically (the highest accuracy possible as of the date of filing of the subject application was about ±0.3–0.5 mm). In addition, when exposure units are removed on the occasion of maintenance or the like, it has been very difficult to position them again at their original positions.

Further, in the method mentioned above wherein a pattern image (a registration mark) provided in advance on an image forming member (a photoreceptor) or a transfer member is detected in terms of position by a photo-coupler, or in a method wherein toner images are formed on a photoreceptor or on a transfer member and they are detected by a photo-coupler that is used exclusively for positional detection, an exclusive photo-coupler needs to be provided for controlling, which has resulted in disadvantages in space and cost and in remarkable deterioration of image quality.

In addition to the above, in the secondary scanning direction, namely in the rotating direction of an image forming member, various factors such as speed variation of the driving source, eccentricity in intermediate power transmission means, and surface speed variation caused by expansion and contraction of a belt-shaped image forming member due to temperature change may cause positional variation of each image writing in the secondary scanning direction, deterioration of accuracy of registration in the secondary scanning direction, inability of accurate superposition of each color image and deterioration of image quality.

In a color image forming apparatus, positional slip (registration slip) of superposition of toner images to be superimposed results in a change in shade which causes deterioration of image quality.

Actually, accuracy of superposition is required to be equal to or higher than the accuracy on the order of one pixel unit, 80 $\mu$m–100 $\mu$m for example.

The registration slip includes the slip in the primary scanning direction and that in the secondary scanning direction. Though various causes are considered for the slips in both primary and secondary scanning directions, the slip in the primary direction will be explained as follows. Two causes for the slip are discussed below.

The first cause is that there is a precision limit in the positional relation between a writing unit and an image forming member when the positional relation relies on only accuracy of assembly. Especially when superposition of two or more images each having different color formed by a plurality of writing units is performed during one rotation of the image forming member, each writing unit itself is deviated in position although an image position is registered in each writing unit. Thereby, the image position for each color is deviated.

The second cause is a problem on the side of an image forming member that an image position varies continually because of movement or stagger in the thrust direction of the image forming member taking place during running of image formation because of temperature change. Even when adjustment is made so that an image for each color may be written at the same position in the primary scanning direction, a position of the image made previously is changed for each writing, making it impossible for images to be superimposed accurately.

A method used to solve the registration slip due to the first cause is discussed below called an index sensor, is provided in the vicinity of an image forming member on a writing position, the photoreceptive sensor is irradiated by a laser beam for writing use during the primary scanning for writing, and signals obtained therefrom are utilized as a reference signal for start writing images.

In the method mentioned above, one writing unit is used and when an image on one sheet is obtained through several rotations of a photoreceptor, the positional relation between a photoreceptive sensor and an image is the same for each color and it causes no problem.

When a plurality of writing units are used and two or more images each having different color are superimposed through a single rotation of an image forming member, however, a plurality of index sensors each corresponding to each writing unit are needed. Positioned relation between each index sensor and each image forming member may be kept to a certain level with mechanical accuracy, but it is limited at most to 0.3–0.5 mm. Therefore, an image position for the first color formed on the image forming member cannot be identified accurately, which makes it impossible to superimpose accurately an image for the second color on the image for the first color.

With regard to the second cause, when a belt-shaped image forming member is used as an image forming member, a belt is always accompanied by stagger, and in this case, a positional relation between an index sensor and an image forming member at a writing position changes continually by an amount of the stagger. Though an amount of stagger can be reduced by mechanical accuracy, or an error can be minimized by incorporating some stagger control system, the limit for reducing an amount of stagger is about 0.2 mm.

To solve the foregoing problems a registration mark is put on an image forming member in advance, the registration mark is detected by an exclusive photo-coupler provided in the vicinity of a writing position, a stagger amount of the image forming member is calculated from the detection signals, and the start of writing images is delayed by the amount of stagger for avoiding the registration slip.

When one writing unit is used and one sheet of image is obtained through several rotations of a photoreceptor as described above, the same photo-coupler is used for each color (since only one photo-coupler is used) and not problem is caused.

When a plurality of writing units are used and two or more images each having different color are superimposed through a single rotation of an image forming member, however, a plurality of photo-couplers each corresponding to each writing unit are needed, and a positional error is caused in positioning the photo-couplers. The error in this case can also be reduced to a certain extent through mechanical accuracy, but the limit for reducing the error is about 0.1–0.2 mm at the best. In this case, an exclusive sensor used for controlling has caused disadvantages in space and cost aspects, and yet satisfactory positioning is not achieved and image quality has deteriorated extremely.

Further, with regard to a scanning exposure apparatus, an optical system disclosed in Japanese Patent O.P.I. Publication No.95361/1983 is known for its compactness. In this case, both sides of the primary scanning line need a pattern image on a photoreceptor or a transfer member because a laser beam in which the scanning direction is opposite to the writing direction is used.

SUMMARY OF THE INVENTION

An object of the invention is to correct those including the dispersion in mounting position of an image forming member in a writing unit on a color image forming apparatus, the deviation of writing position caused by temperature change, the position slip in the secondary scanning direction of a laser beam caused by speed variation during rotation of the image forming member and color slip in the primary scanning direction of a laser beam caused by movement or stagger in the thrust direction during rotation of the image forming member, and to prevent color slip by avoiding the deviation of the starting position for exposure for forming a latent image in repetition of a plurality of latent image formation without the necessity of positioning with strict accuracy.

In a first embodiment of a color image forming apparatus of the invention for achieving the object mentioned above, the color image forming apparatus comprising, with regard to the movement direction for secondary scanning of one image forming member, a plurality of primary scanning exposure units conducting primary scanning exposure on a plurality of positions on the image forming member, a plurality of charging units corresponding to irradiation positions of primary scanning of the exposure units and a plurality of developing units, for forming superimposed toner images on the image forming member to obtain a multi-color or full-color image through transferring and fixing, is formed so that a light-reflective registration mark is put on a non-image area on the side of the surface of the image forming member, at least two exposure units out of a plurality of primary scanning exposure units mentioned above are used for irradiating, with each primary scanning beam, the registration mark moving in the secondary scanning direction, each reflected light from the registration mark is received by a plurality of photoreceptive sensors each corresponding to the point of irradiation by means of the primary scanning beam, thereby detection signals for the registration mark position are generated, timing of writing by means of primary scanning beam and a distance between bright lines formed on the image forming member by primary scanning beams of at least two exposure units mentioned above are detected, and thus feedback is applied to timing control for the start of image writing and to control for driving the image forming member.

In a second embodiment of a color image forming apparatus of the invention, the color image forming apparatus is formed so that a light-transmitting registration mark is put on a non-image area on the side of the surface of the image forming member, at least two exposure units out of a plurality of primary scanning exposure units mentioned above are used for irradiating, with each primary scanning beam, the registration mark moving in the secondary scanning direction, each light transmitted through the registration mark is received by a plurality of photoreceptive sensors each corresponding to the point of irradiation by means of the primary scanning beam, thereby detection signals for the registration mark position are generated, timing of writing by means of primary scanning beam and a distance between bright lines formed on the image forming member by primary scanning beams of at least two exposure units mentioned above are detected, and thus feedback is applied to timing control for the start of image writing and to control for driving the image forming member.

Further, in a third embodiment of a color image forming apparatus of the invention, the color image forming apparatus is formed so that a development pattern is formed on a non-image forming area in the vicinity of the side on the image forming member by means of a charging unit located at the extremely upstream position in the secondary scanning direction on a non-image area of the side on the surface of the image forming member, a primary scanning exposure unit and a developing unit, the development pattern moving in the secondary scanning direction is irradiated by a primary scanning beams of a plurality of primary scanning exposure units located at the downstream point, each reflected light from the registration mark is received by a plurality of photoreceptive sensors each corresponding to the point of irradiation by means of the primary scanning beam, thereby detection signals for the development pattern position in the secondary scanning direction are generated, timing of writing by means of primary scanning beam and a distance between bright lines formed on the image forming member by primary scanning beams of at least two exposure units mentioned above are detected, and thus feedback is applied to timing control for the start of image writing and to control for driving the image forming member.

Further, in a fourth embodiment of a color image forming apparatus of the invention, the color image forming apparatus is formed so that a charging unit located at the upstream position in the secondary scanning direction on a non-image area of the side on the surface of the image forming member conducts charging, two-point spot irradiation is applied on the predetermined position on the non-image area of the image forming member by at least two primary scanning exposure units, the change of surface potential on the spot irradiation portion on the image forming member moving in the secondary scanning direction is detected by a plurality of potential sensors provided at positions each corresponding to the point of irradiation by means of primary scanning beams, detection signals for at least two spot-irradiation positions in the secondary scanning direction are generated, timing of writing by means of primary scanning beam and a distance between bright lines formed on the image forming member by primary scanning beams of at least two exposure units mentioned above are detected, and thus feedback is applied to timing control for the start of image writing and to control for driving the image forming member.

In a fifth embodiment of a color image forming apparatus of the invention, the color image forming apparatus comprising, with regard to the movement direction for secondary scanning of one image forming member, a plurality of primary scanning exposure units conducting primary scanning exposure on a plurality of positions on the image forming member, a plurality of charging units corresponding to irradiation positions of primary scanning of the exposure units and a plurality of developing units, for forming superimposed toner images on the image forming member to obtain a multicolor or full-color image through transferring and fixing, is formed so that a development pattern is formed on a non-image forming area in the vicinity of the side on the image forming member by means of a charging unit located at the extremely upstream position in the secondary scanning direction on a non-image area of the side on the surface of the image forming member, a primary scanning exposure unit and a developing unit, the development pattern is irradiated by a primary scanning beams of a plurality of primary scanning exposure units located at the downstream point, each reflected light is received by photoreceptive sensors, thereby detection signals for the development pattern in the secondary scanning direction are generated, thus, writing of each image in the secondary scanning direction can be registered when image writing is started after a predetermined period of time.

Further, in a sixth embodiment of a color image forming apparatus of the invention, the color image forming apparatus is formed so that a development pattern of light-transmitting toner is formed on a non-image forming portion in the vicinity of the side on the image forming member by a primary scanning exposure unit located at the extremely upstream point of the image forming member with regard to its moving direction and a developing unit, the development pattern is irradiated by primary scanning beams of a plurality of primary scanning exposure units located at the downstream point, transmitted light therefrom is received by a photoreceptive sensor, thereby detection signals for the development pattern are generated, thus, writing of each image in the secondary scanning direction can be registered when image writing is started after a predetermined period of time.

Further, in a seventh embodiment of a color image forming apparatus of the invention, the color image forming apparatus is formed so that the spot irradiation is applied at a portion on a non-image area of the image forming member by using primary scanning exposure light of at least one exposure unit out of a plurality of exposure units, the change of surface potential on the spot irradiation portion on the image forming member is detected by a potential sensor provided in the vicinity of the image forming member, thereby detection signals for the spot irradiation position are generated, thus, writing of each image in the secondary scanning direction can be registered when image writing is started after a predetermined period of time.

In a eighth embodiment of a color image forming apparatus of the invention, the color image forming apparatus comprising, with regard to the movement direction for secondary scanning of one image forming member, a plurality of primary scanning exposure units conducting primary scanning exposure on a plurality of positions on the image forming member, a plurality of charging units corresponding to irradiation positions of primary scanning of the exposure units and a plurality of developing units, for forming superimposed toner images on the image forming member to obtain a multicolor or full-color image through transferring and fixing, is formed so that a light-reflective registration mark is put on a non-image area on the side of the surface of the image forming member, at least one exposure unit out of a plurality of primary scanning exposure units mentioned above is used for irradiating, with each primary scanning beam, the registration mark, reflected light from the registration mark is received by a photoreceptive sensor thereby detection signals for the registration mark position are generated, thus, writing of each image in the secondary scanning direction can be registered when image writing is started after a predetermined period of time.

In a ninth embodiment of a color image forming apparatus of the invention, the color image forming apparatus comprising, with regard to the movement direction for secondary scanning of one image forming member, a plurality of primary scanning exposure units conducting primary scanning exposure on a plurality of positions on the image forming member, a plurality of charging units corresponding to irradiation positions of primary scanning of the exposure units and a plurality of developing units, for forming superimposed toner images on the image forming member to obtain a multicolor or full-color image through transferring and fixing, is formed so that a light-transmitting registration mark is put on a non-image area on the side of the surface of the image forming member, at least one exposure unit out of a plurality of primary scanning exposure units mentioned above is used for irradiating, with each primary scanning beam, the registration mark, light transmitted through the registration mark is received by a photoreceptive sensor thereby detection signals for the registration mark position are generated, thus, writing of each image in the secondary scanning direction can be registered when image writing is started after a predetermined period of time.

In the tenth constitution of a color image forming apparatus of the invention, the color image forming apparatus comprising a plurality of primary scanning exposure units conducting primary scanning exposure on a plurality of positions on a moving image forming member, a plurality of charging units corresponding to irradiation positions of scanning beams from the exposure units and a plurality of developing units, for forming superimposed toner images on the image forming member to obtain a multi-color or full-color image through transferring and fixing, is formed so that a light-reflective registration mark is put on the side edge on the surface of the image forming member, the registration mark is irradiated by a primary scanning beam from the exposure unit, light reflected therefrom is received by a photoreceptive sensor, thereby detection signals for the registration mark position are generated, and then image writing is started after a predetermined period of time.

In an eleventh embodiment of a color image forming apparatus of the invention, a light-transmitting registration mark is provided at the side edge on the surface of an image forming apparatus, the registration-mark is irradiated by a primary scanning beam from the aforementioned exposure unit, light transmitted therefrom is received by a photoreceptive sensor, thereby detection signals for the registration mark position are generated, and image writing is started after a predetermined period of time.

Further, in a twelfth embodiment of a color image forming apparatus of the invention, the color image forming apparatus is formed so that a development pattern is formed on a non-image forming portion in the vicinity of the side on the image forming member by a primary scanning exposure unit located at the extremely upstream point of the image forming member with regard to its moving direction and a developing unit, the development pattern is irradiated by primary scanning beams of a plurality of primary scanning exposure units located at the downstream point, reflected light therefrom is received by a photoreceptive sensor, thereby detection signals for the development pattern are generated, thus, writing of each image is started after a predetermined period of time.

Further, in a thirteenth embodiment of a color image forming apparatus of the invention, the color image forming apparatus is formed so that a development pattern of light-transmitting toner is formed on a non-image forming portion in the vicinity of the side on the image forming member by a primary scanning exposure unit located at the extremely upstream point of the image forming member with regard to its moving direction and a developing unit, the development pattern is irradiated by primary scanning beams of a plurality of primary scanning exposure units located at the downstream point, and transmitted light therefrom is received by a photoreceptive sensor, thereby detection signals for the development pattern are generated, thus, writing of each image is started after a predetermined period of time.

Further, in a fourteenth embodiment of a color image forming apparatus of the invention, the color image forming apparatus is formed so that the spot irradiation is applied at a portion on a non-image area of the image forming member by using primary scanning exposure light of at least one exposure unit out of a plurality of exposure units, the change of surface potential on the spot irradiation portion on the image forming member is detected by a potential sensor provided in the vicinity of the image forming member, thereby detection signals for the spot irradiation position are generated, thus, writing of each image is started after a predetermined period of time.

DETAILED DESCRIPTION OF THE PREFERRED EMBODIMENTS

Figure 1:
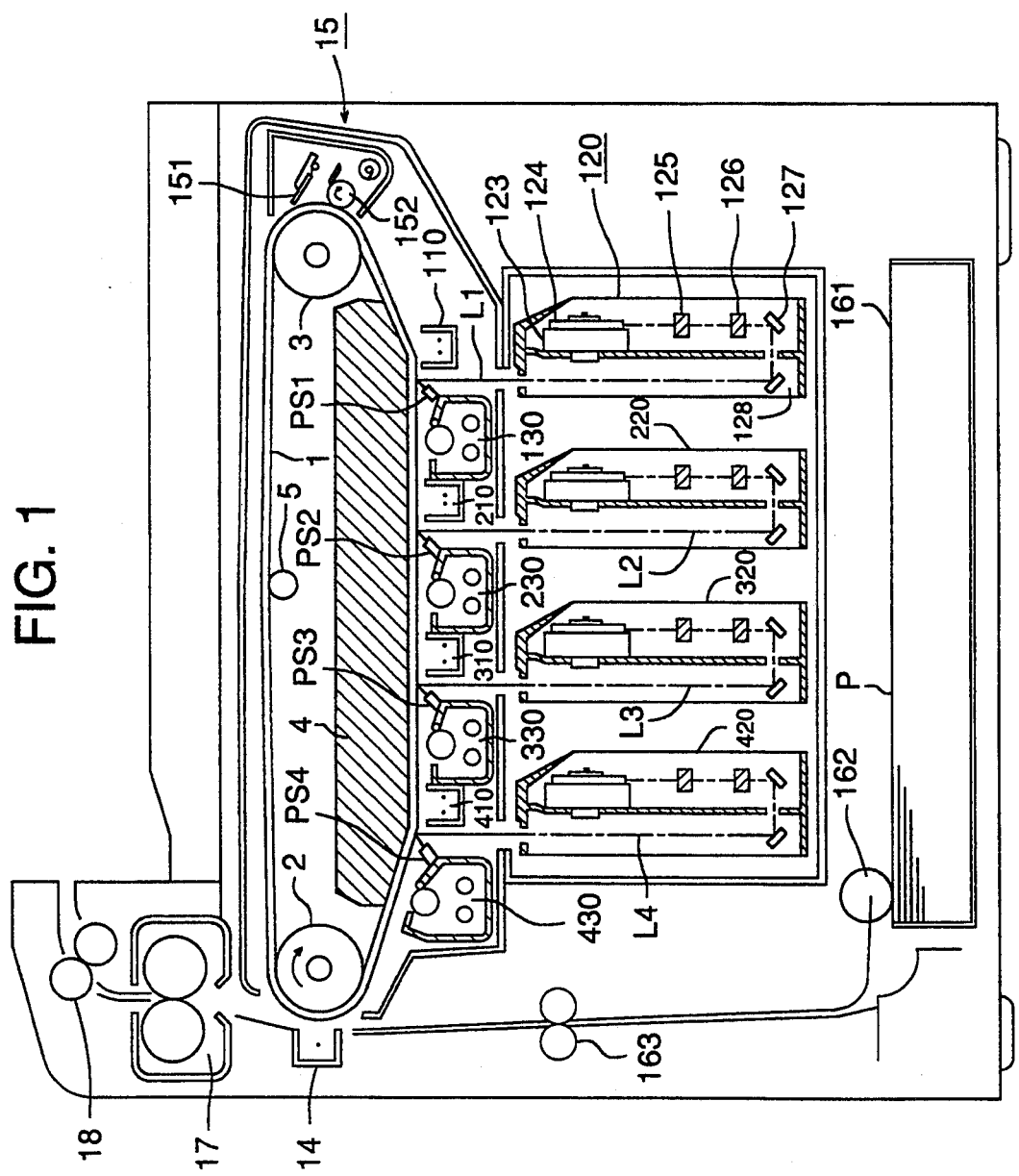
FIG. 1 is a general structural diagram of a color image forming apparatus related the present invention.

Next, examples of the invention will be explained as follows, referring to the drawings.

Figure 2:
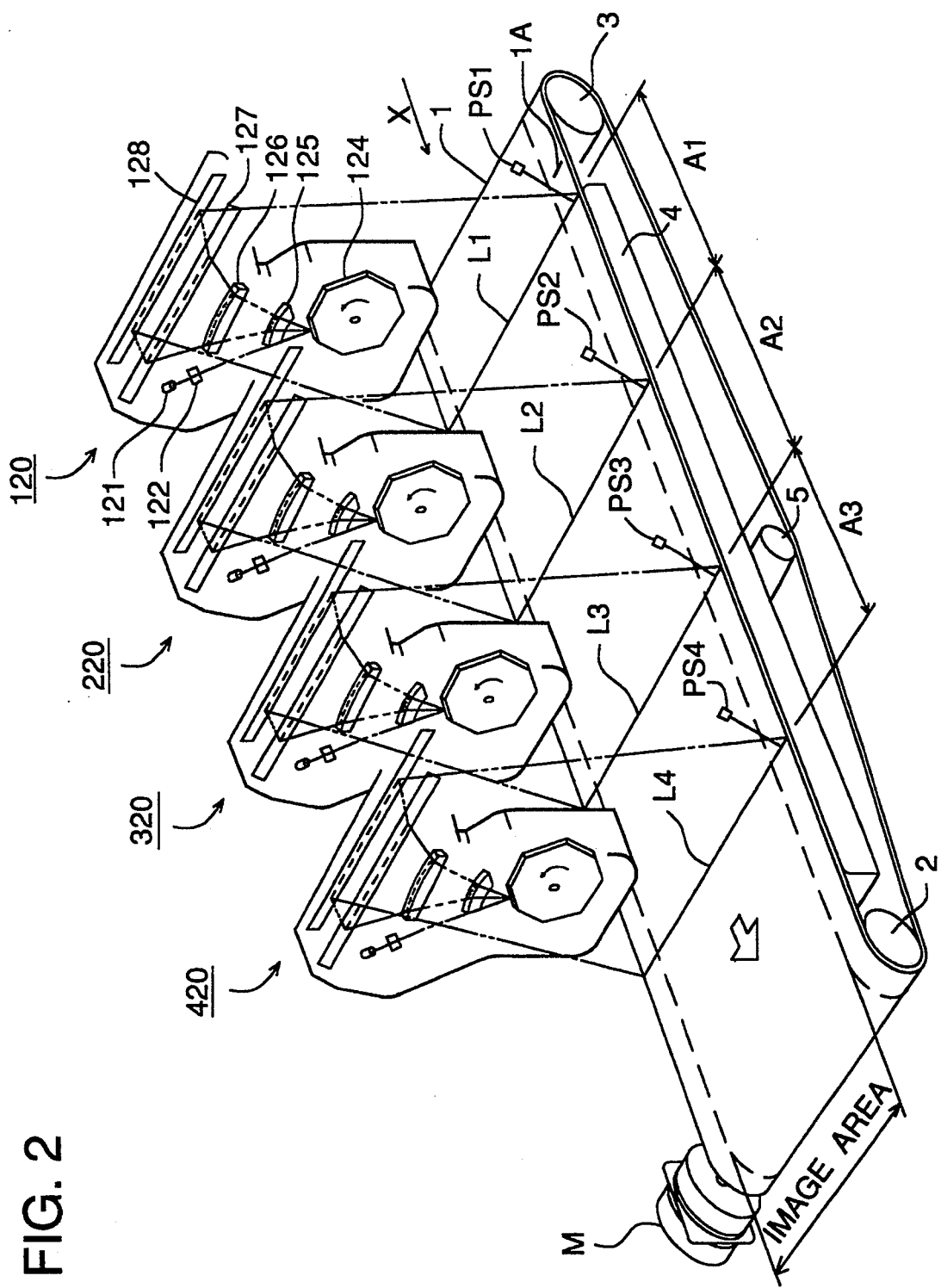
FIG. 2 is a perspective view showing the first example of a laser scanning exposure unit of the color image forming apparatus of the invention.

FIG. 1 represents a general structural diagram of a color printer that is an example of a color image forming apparatus equipped with a belt-shaped image forming member, which is an example of the invention, and FIG. 2 represents a perspective view showing the above-mentioned belt-shaped image forming member and an optical path of a laser scanning exposure unit.

In a color image forming apparatus of the present example in FIG. 1, an image forming means composed of a plurality of charging units 110, 210, 310 and 410, exposure primary scanning lines L1, L2, L3 and L4 and 4 developing units 130, 230, 330 and 430 each containing toner of different color is provided the belt-shaped image forming member 1, and one rotation of the above-mentioned image forming member 1 produces a yellow toner image, a magenta toner image, a cyan toner image and a black toner image which are superimposed to form a color image.

The belt-shaped image forming member 1 is a belt-shaped photoreceptor (hereinafter referred to as a photoreceptor belt) wherein photoconductive substances are coated or evaporated on a flexible belt, and it is spread over rotating rollers 2 and 3 as well as guide member 4 so that it may be transported with its surface kept constantly at the fixed position in a manner that tension roller 5 is positioned to be in pressure-contact with the photoreceptor belt 1 and tension therefrom keeps the photoreceptor belt to be in contact with the guide member 4 that represents a reference position when the photoreceptor belt is transported. Because of this construction, a photoreceptor on the external surface of photoreceptor belt 1 is kept constantly in a fixed positional relation with the surface of guide member 4 so that an image forming surface having a long radius of curvature and a long width may be formed stably, thus many image forming means each having the same shape can be arranged in parallel at regular intervals.

Though photoreceptor belt 1 is used as an image forming member in the present example, the invention is not limited thereto, and it may also be applied to existing image forming members having a photoreceptive layer such as a photoreceptor drum.

There are provided, around the photoreceptor belt 1, a plurality of charging means, a plurality of exposure means, four developing means each having different color toner loaded therein, a transferring means and a cleaning means The charging means are provided for charging uniformly the photoreceptive layer on the photoreceptor belt 1 with predetermined polarity, and they are represented by existing charging units 110, 210, 310 and 410 such as a corona charging unit or a scorotron charging unit.

The exposure means are represented by semiconductor laser writing units (laser scanning exposure unit) 120, 220, 320 and 420, and the surface of the photoreceptor belt 1 charged by the aforementioned corona charging units 110, 210, 310 and 410 is subjected to exposure by means of the exposure means to forming thereon latent images.

The developing means are represented by four developing units 130, 230, 330 and 430 each having therein different color developer, such as, for example, yellow (Y) toner, magenta (M) toner, cyan (C) toner and black (K) toner. These developing units 130, 230, 330 and 430 have functions, respectively for developing the latent images on the photoreceptor belt 1 to be visible toner images through a non-contact developing method. This non-contact developing method can offer an excellent color image because, in the method, a toner image formed previously on the photoreceptor belt 1 is not damaged in the following image forming and movement of photoreceptor belt 1 is not hindered, which is different from a contact type developing method.

The transferring means which is represented by transfer unit 14 such as a transfer corona discharging unit transfers a toner image formed on the photoreceptor belt 1 onto a transfer material. As a transferring means, an existing transferring member such as a transfer drum may be used in place of transferring unit 14.

The cleaning means 15 is provided with cleaning blade 151 and cleaning roller 152, and it is kept to be in pressure-contact with the surface of the photoreceptor belt 1 to clean the same.

The following is the process wherein a color image is formed by the image forming apparatus having the aforementioned constitution.

When image signals for the first color outputted from an image reading device that is independent to the image forming apparatus are inputted in the aforementioned laser scanning exposure unit 120, a laser beam is generated by laser beam source 121 incorporated in the laser scanning exposure unit 120. The laser beam is then caused by polygon mirror 124 rotated by driving motor 123 to conduct rotation scanning through collimation lens 122, and it is projected, through fθ lens 125 and cylindrical lens 126, on the surface of the photoreceptor belt 1 charged uniformly in advance by charging units 110–410. with predetermined charges, to form bright lines.

With regard to the secondary scanning direction, on the other hand, registration mark 1A corresponding to a specific position on the photoreceptor belt 1 is detected by a photosensor, and with the detected signals as a reference, modulation of the laser beam source 121 by means of image signals is started, and a primary scanning line in the secondary scanning direction is determined. After scanning is started, with regard to the primary scanning direction, a fixed position is detected by a laser beam of the first laser beam source 121, and with the detected signals as a reference, modulation of laser beam source 121 by means of the first color image signals is started, thus, modulated laser beam scans the surface of the photoreceptor belt 1. Therefore, due the primary scanning by means of a laser beam and the secondary scanning be means of conveyance of the photoreceptor belt 1, a latent image corresponding to the first color is formed on the surface of the photoreceptor belt 1 charged uniformly. This latent image is developed by developing unit 130 containing therein yellow toner and thereby a yellow toner image is formed on the surface of the photoreceptor belt 1. After this, the photoreceptor belt 1 is conveyed while it holds thereon the yellow toner image for the succeeding image formation for the second color.

Namely, after the photoreceptor belt 1 on which the yellow toner image is formed is conveyed to the position of the next charging unit 210 in the same manner as in the image signals for the first color mentioned above, the photoreceptor belt 1 is charged again by the charging unit 210. After the predetermined period of time from the start of modulation of the first laser beam source is counted by a timer, modulation of the semiconductor laser in the laser scanning exposure unit 220 by means of the second image signals is started, and the laser beam generated by semiconductor laser is then caused by polygon mirror rotated by a driving motor to conduct rotation scanning through the collimation lens. The laser beam is projected, through fθ lens and a cylindrical lens, on the surface of the photoreceptor belt 1 charged uniformly by charging unit 210 with predetermined charges, to form a latent image. The latent image is developed by developing unit 230 containing therein magenta toner as the second color. A magenta toner image is formed on the yellow toner image which has already been formed.

In the same manner as in the foregoing, the photoreceptor belt 1 on which the magenta toner image is formed as the second color is further conveyed and is charged uniformly by the charging unit 310 in the same manner as in the case of the second color image signals mentioned above, and a latent image is formed by means of laser scanning exposure unit 320. Thus, the latent image is developed by developing unit 330 containing therein cyan toner to be a cyan toner image. Further, the photoreceptor belt 1 on which the cyan toner image is formed as the third color is further conveyed and is charged uniformly by the charging unit 410 in the same manner as in the case of the second and third color image signals mentioned above, and a latent image is formed by means of laser scanning exposure unit 420, thus, the latent image is developed by developing unit 430 containing therein black toner to be a black toner image to be superimposed, thus a color toner image is formed on the photoreceptor belt 1. Namely, a color toner image is formed when the photoreceptor belt 1 makes one turn.

DC or further AC bias voltage is impressed on each of the developing units 130–430 so that the photoreceptor belt 1 whose base is grounded may be subjected to reversal development (jumping development) on a non-contact basis. Incidentally, this non-contact development can accept either a single-component developer or a two-component developer. When a single-component developer is used, it is not necessary to provide a toner concentration control means and thereby it is possible to make a developing unit small. On the point of stability of development, however, a development method using a two-component developer is superior, and it is preferable in terms of color reproduction.

A color toner image formed on the photoreceptor belt 1 as stated above is transferred onto a transfer material that is fed out from sheet feeding cassette 161 by sheet feeding roller 162 and synchronized with the color toner image mentioned above by timing roller 163. Transfer unit 14 impresses high voltage that is contrary to toner in terms of polarity for transferring.

Thus, the transfer material on which the color toner image has been transferred is separated perfectly from the photoreceptor belt 1 that makes a sharp turn (small radius of curvature) along rotating roller 2, and then toner of the color toner image is melted and fused by fixing means 17. After that, the transfer material is conveyed by sheet-ejecting roller 18 to be ejected from the main body of the apparatus.

On the other hand, the photoreceptor belt 1 from which the color toner image has been transferred to the transfer material is further conveyed clockwise, and residual toner thereon is removed for cleaning by cleaning means 15 whose cleaning blade 151 and cleaning roller 152 are kept to be in pressure-contact. After completion of cleaning, succeeding process of image formation is started again.

Incidentally, the color image forming apparatus of the present example is of a one-path system wherein an image forming means composed of a plurality of charging units 110–410, a plurality of exposure units 120–420 and four developing units 130–430 each containing different color toner is provided around the photoreceptor belt 1 and one turn of the photoreceptor belt 1 forms a color image by superimposing a yellow image, a magenta image, a cyan image and a black toner image. The invention is not limited to the one-path system however, it may also be embodied in a multi-rotation system wherein latent image formation and development therefor are conducted in each rotation of an image forming member, as a matter of course.

A color printer shown in FIG. 1 is of a compact design wherein a dioptric system employing a plurality of mirrors is used due to four exposure units to be arranged.

A correction action in the invention wherein a position in the secondary scanning direction of photoreceptor belt 1 is detected, the deviation thereof is corrected and thereby a plurality of images are registered in terms of position will be explained further in detail.

As shown in FIG. 2, registration mark 1A formed in advance by means of printing or the like is provided in the direction perpendicular to the secondary scanning direction X in the vicinity of the side that is out of an image area on a photoreceptive surface of the photoreceptor belt 1. The registration mark 1A is a reference in the secondary scanning direction determining the starting time of exposure for each of primary scanning lines L1, L2, L3 and L4 in the direction of primary scanning by means of a laser beam described later.

Photosensor PS1 is affixed a position that is over the place in the vicinity of the location where the aforementioned primary scanning line L1 and the moving registration mark 1A mentioned above agree in terms of position. Reflected light of the registration mark 1A by means of primary scanning line L1 of a laser beam is received by the photosensor PS1.

Figure 3:
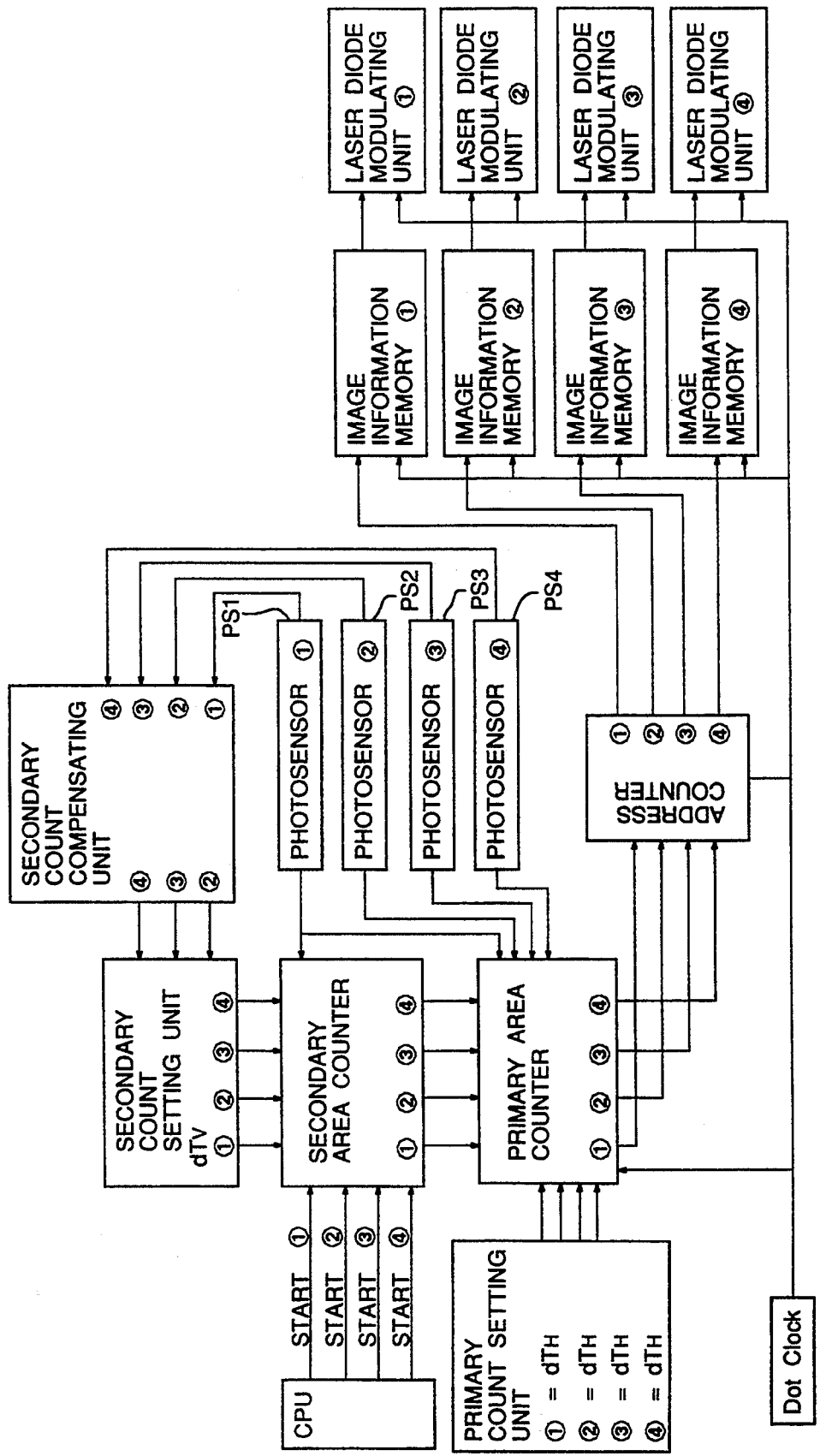
FIG. 3 is a control block diagram for the laser scanning exposure unit mentioned above.

FIG. 3 represents a block diagram of scanning exposure correction that prevents deviation of a laser beam in the primary scanning direction and in the secondary scanning direction. In this case, a secondary area counter is a counter to slip the secondary scanning direction, a secondary count setting unit is a unit to set the timing period from the reference detection value of registration mark 1A to the start of image writing in the secondary scanning direction, a secondary count compensating unit is a unit to compensate the count number established in advance, a primary area counter is a counter to move the primary scanning direction, and a primary count setting unit is a unit to set the timing period from the end detection reference value of the registration mark 1A to the start of image writing in the primary scanning direction.

Figure 8:
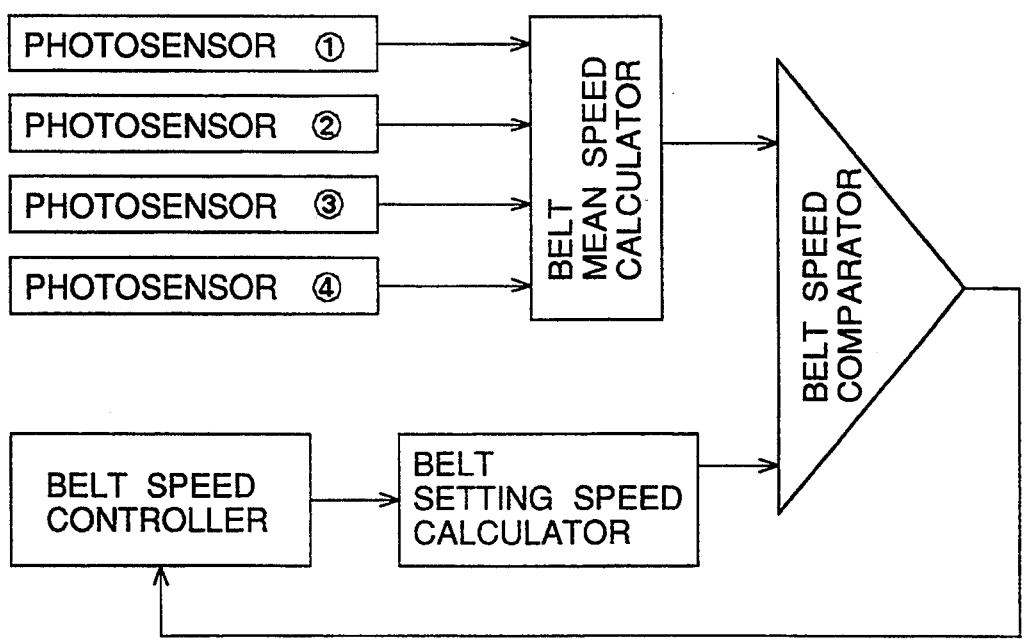
FIG. 8 is a block diagram for speed correction made by means of the invention.

First, the belt speed compensation control for a photoreceptor belt will be explained. FIG. 8 is a block diagram therefor.

Before image writing, the photoreceptor belt is rotated and an image writing unit starts its scanning exposure with its laser beam lit.

A laser beam for image writing in the primary scanning line L1 mentioned above irradiates registration mark 1A formed on a non-image area on the rotating photoreceptor belt 1, and reflected light therefrom is received by photosensor PS1, thus detection signals of the registration mark 1A are generated.

After the foregoing, in primary scanning line L2, registration mark 1A on the photoreceptor belt 1 is irradiated by a laser beam for image writing on the primary scanning line L2 in the same manner as in the previous case, and reflected light therefrom is received by photosensor PS2 and detection signals are thereby obtained.

The belt speed between L3 and L4 is detected from detection of passing time of each of primary scanning lines L3 and L4 and line interval A3.

From the belt speeds mentioned above, an average speed is calculated and it is compared with the speed established in advance for compensation.

Namely, when the belt speed is judged to be slow, a command is sent to a belt drive control unit for compensation so that the speed may be increased by the difference from the speed established in advance.

By doing the above, it is possible to solve the problem of transfer slip and others by causing the variation in the belt speed caused by manufacturing errors in diameters of belt-driving rollers and belt thickness to agree with the set value.

In the present example, an average speed of L1 and L2, that of L2 and L3 and that of L3 and L4 are compared with the belt speed set for the reason for enhancing accuracy by averaging. However, comparison may be made between L1 and L2 only for compensation. Further, it is possible to calculate, compare and compensate using a long distance between L1 and L4.

Further, the speed of the photoreceptor in the case of speed compensation does not need to be the same as that in the image forming operation. The purpose is to compensate the belt speed caused by errors in diameters of belt-driving rollers and in belt thickness. Therefore, the only compensation necessary is for the gap of belt speed between the setting speed calculated in a belt-drive control unit based on r.p.m. of a motor and the belt speed actually measured and calculated. For enhancing accuracy, belt speed may be changed to ½–1/5 of the belt speed in an image forming operation only during the period of compensation.

A distance between two primary scanning lines L1 and L2 is established in advance, and detection signals by means of the photosensors PS1 and PS2 as well as a clock tell a period of time for passing the registration mark between the primary scanning lines L1 and L2. Therefore, an average speed for covering the distance between L1 and L2 can be calculated instantly by the CPU.

In the same manner, the speed for covering the distance between L1 line and L2 line of the photoreceptor belt 1 is detected from the detection of passing time of registration mark 1A for each of primary scanning lines L2 and L3 and from distance A2 between two lines.

A laser beam for image writing for the primary scanning line L1 irradiates the registration mark 1A formed on a non-image area of the running photoreceptor belt 1, the reflected light therefrom is received by the photosensor PS1, the detection signals for the registration mark 1A are generated, and the laser beam starts writing the first image (for example, a yellow image) scanned by the primary scanning line L1, after a certain period of time of $dT_H$ in the secondary scanning direction and $dT_V$ in the primary scanning direction.

Then, the first latent image by means of the primary scanning line L1 is formed by the secondary scanning made by the rotation of the photoreceptor belt 1 and a primary scanning beam from the exposure unit 120 mentioned above, and then the latent image is developed by the developing unit 130 to be a visible image and advanced.

The photoreceptor belt 1 is further rotated and the aforementioned registration mark 1A is irradiated by a laser beam for writing located immediately before the second primary scanning line L2, and reflected light therefrom is received by photosensor PS2, thus detection signals for passing of the registration mark 1A are generated.

With regard to the second writing unit, image writing thereof is to be started after a predetermined period of time from the start of writing of the first writing unit which is counted by a timer. The time for the registration mark 1A to pass from line L1 to line L2, which is newly measured in this case, is compared with the time established in advance.

When there is no error in terms of mechanical assembly for the distance A1 between L1 and L2 and when there is no variation in temperature, there is no difference between the measured value and the expected value. However, when calculated a difference greater than an equivalent of one line of exposure scanning is calculated due to accumulation of small errors and variations, the time for starting the second writing is compensated by that difference.

In the same manner detection of passing time of the registration mark 1A for each of primary scanning lines L2 and L3 is compared with the time established in advance. The secondary count compensated by a secondary count compensating unit controls the time to start writing the third image (for example, a cyan image). In the same way, detection of passing time for each of primary scanning lines L3 and L4 is compared with the time established in advance and the time to start writing is controlled to write the fourth image (for example, a black image) successively.

Incidentally, one line of the registration mark 1A is formed on the photoreceptor belt 1 in FIG. 2. However, it is also possible to provide a plurality of registration marks at regular intervals so that they may be detected by photosensors PS1–PS4 at short intervals for controlling.

Even in this case, the passing time for covering the distance between L1 and L3, or between L1 and L4 may also be compared naturally with the established time for compensation, without being limited to the distance between L1 and L2, L2 and L3, or L3 and L4.

Since the photosensors PS1 - PS4 mentioned above can be positioned closely to the surface of the photoreceptor belt 1, detection accuracy for controlling the time of start writing in the secondary scanning direction is high, and the photosensors have only to be provided on one side of the photoreceptor belt 1. Therefore, the space for photosensors may be minimized. Incidentally, the registration mark 1A and a photosensor are not limited only to detection of reflected light of a laser beam, but they may also be applied to detection of reflected light of primary scanning exposure wherein an LED array is used. After that, the process advances to image formation.

Figure 4:
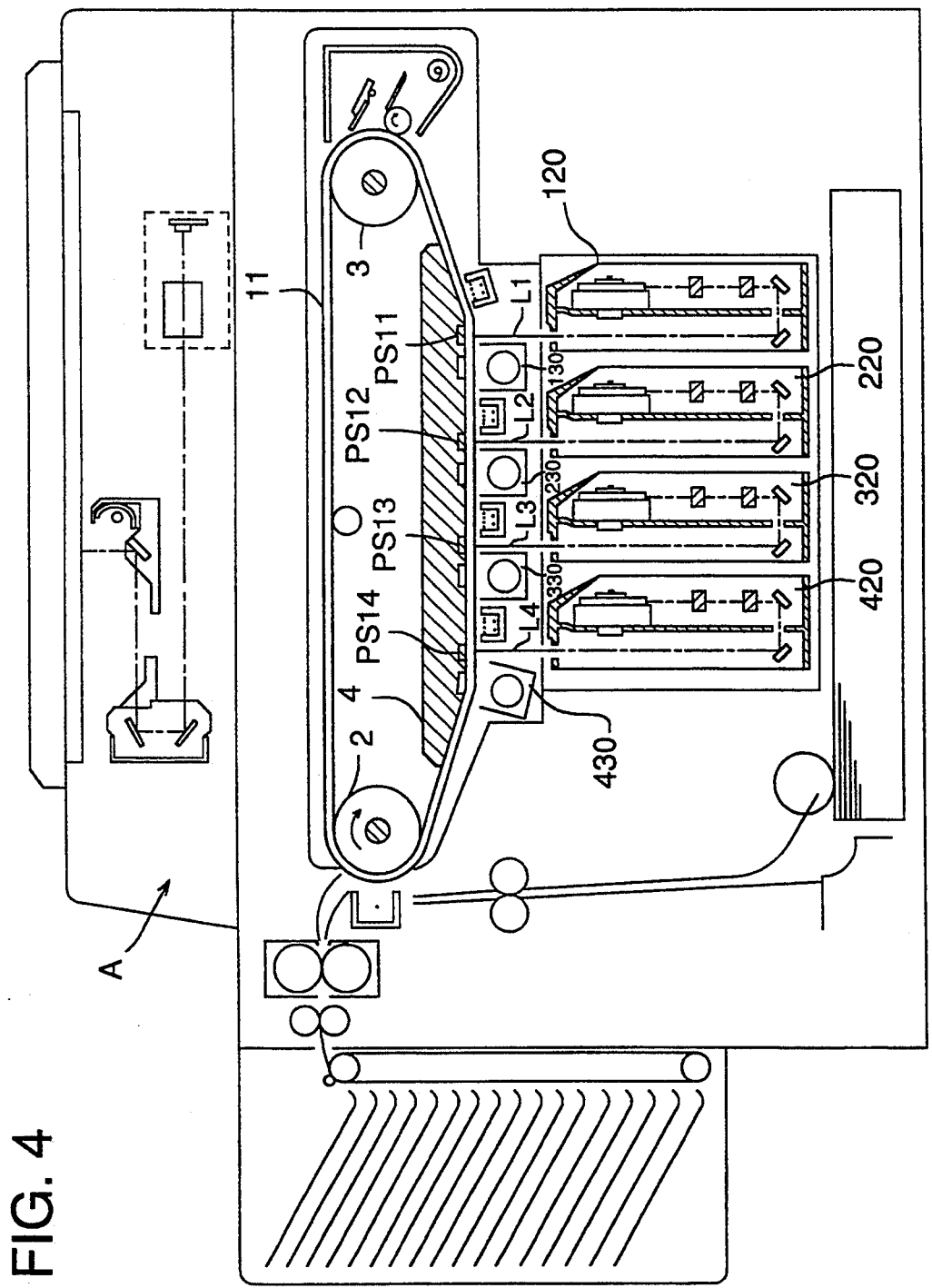
FIG. 4 is a general structural diagram for the second and twelfth examples of a color image forming apparatus of the invention.

FIG. 4 is a general structural diagram of a color copying machine equipped, as the second example of the invention, with photoreceptor belt 11 on which a light-transmitting registration mark is formed and image reading system A located on the upper portion thereof.

Figure 5:
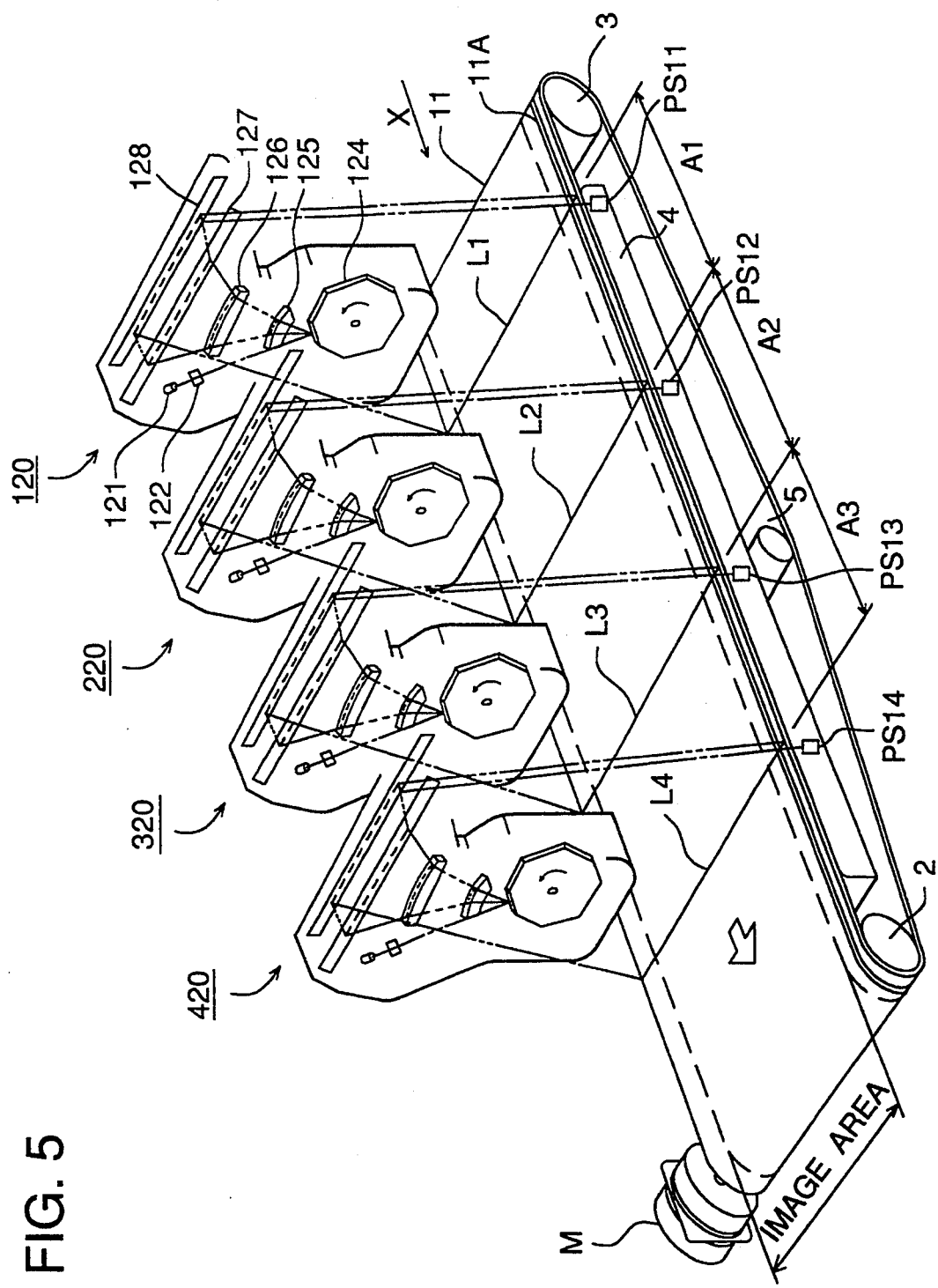
FIG. 5 is a perspective view of a laser scanning exposure unit in the second example of the color image forming apparatus mentioned above.

FIG. 5 is a perspective view of the second example showing the photoreceptor belt 11 mentioned above and an optical path of a laser scanning exposure unit. Incidentally, portions having the same functions as those in the first example in the figure are given the same symbols as in the first example. Points different from the first example will be explained as follows.

Light-transmitting registration mark 11A is formed at mostly the same place as the aforementioned registration mark 1A in the vicinity of the side end of a non-image area on the photoreceptor belt 11 in the manner that the registration mark 11A may transmit light. On the other hand, the guide member 4 mentioned above is provided with a recess at the place where the registration mark 11A and each primary scanning line L1 fall in line and cross each other and photosensor PS11 is affixed in the recess as a photo-detection means. The photosensors PS11–PS14 detect a laser beam for exposure scanning emitted from exposure unit 120 which is transmitted through the light-transmitting registration mark 11A, and generates signals for the reference position in the secondary scanning direction for determining the position of secondary scanning of L2–L4 for the nest process.

In this example again, at least two laser beams are used for irradiating the registration mark 11A provided on the photoreceptor belt 1 in the same manner as in the foregoing, and transmission of the registration mark 11A is detected by each photosensor by means of transmitted light therefrom. Thus, the time required to cover the distance between two points and its distance detect the change in speed which is fed back to the control of driving the photoreceptor belt 11. Further, based on the time for passing two points, the starting time for each image writing is controlled. Owing to this, timing for each line of writing for each color can be brought in line each other.

Figure 6:
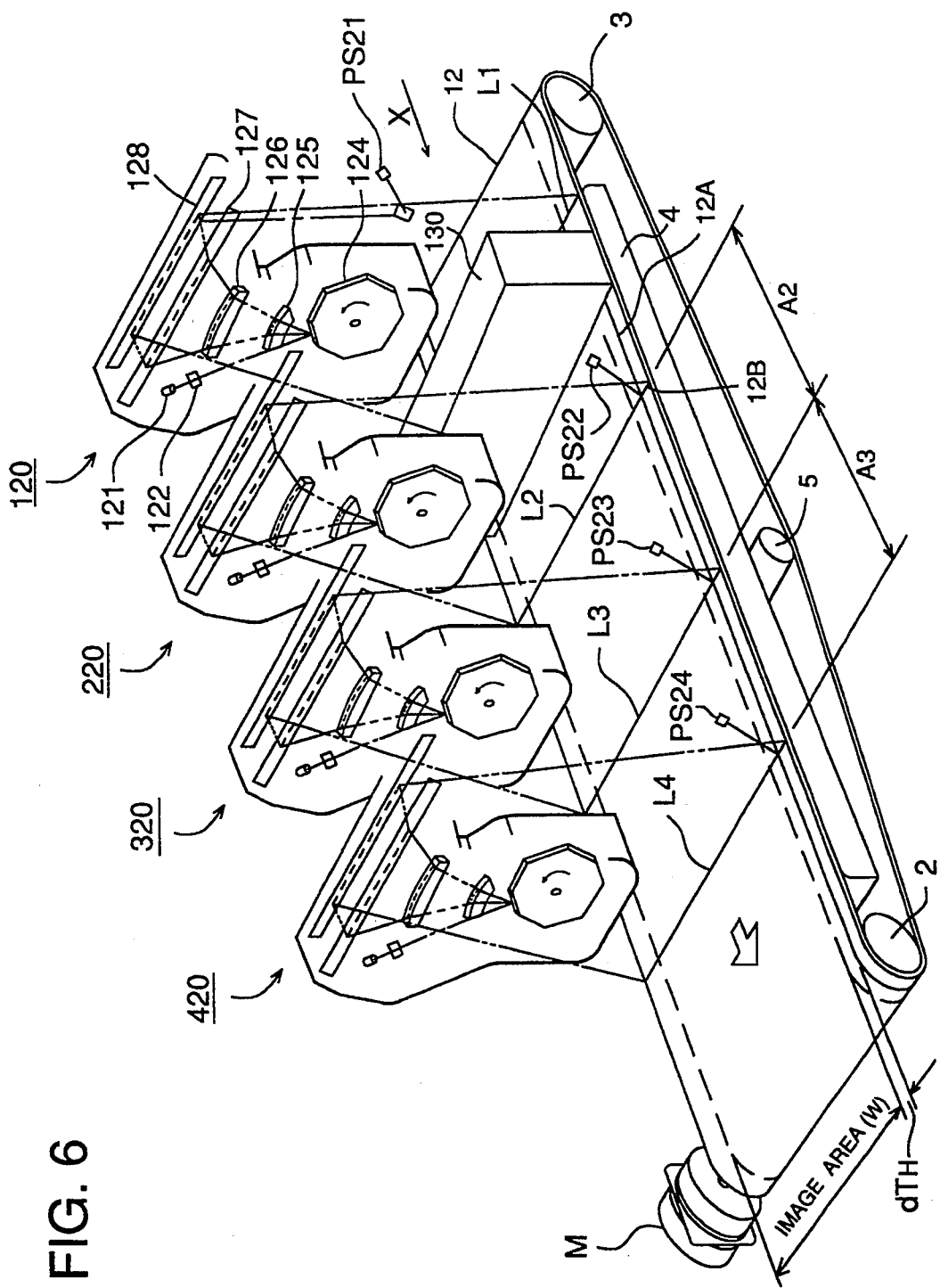
FIG. 6 is a perspective view showing an image forming member and a scanning exposure unit both as the third example.

FIG. 6 shows the third example of the invention and it represents a perspective view showing the belt-shaped image forming member and an optical path of a laser scanning exposure unit.

On the surface of the photoreceptor belt 12 which is charged in advance, a latent image of scanning line L1 is formed by a laser beam of the laser scanning exposure unit 120, and prior to this, latent images of registration marks 12A and 12B are formed in the vicinity of the side end of a non-image area. The latent images of the registration marks 12A and 12B are developed by the first developing unit 130 to be visible registration marks 12A and 12B. PS1 is a beam detector (photosensor) which receives a laser beam entering therein from rotating polygon mirror 124 through fθ lens 125 and and generates output signals and further outputs beam detect signals in a shape of a square wave based on an arbitrary set value by means of a beam detect detection circuit.

After generation of beam detect signals, registration marks 12A and 12B are formed to be latent images through exposure to laser beams after lapse of time set by registration mark count setting unit.

Figure 7:
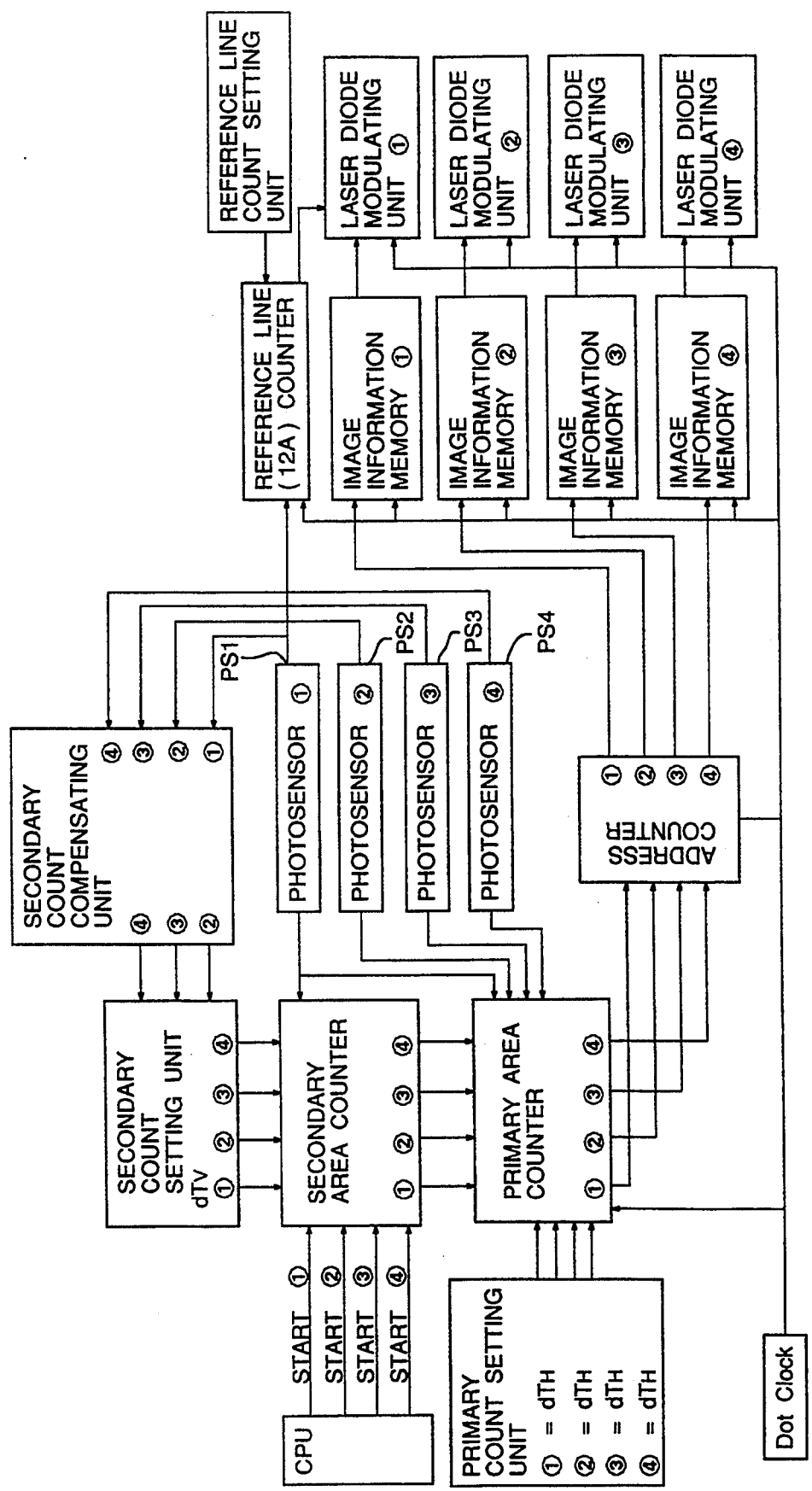
FIG. 7 is a control block diagram of the third example of the scanning exposure unit mentioned above.

FIG. 7 is a block diagram of scanning exposure compensation that prevents deviation of a laser beam in the primary scanning direction and the secondary scanning direction. In this case, a secondary area counter is a counter for deviating the secondary scanning direction and secondary count setting unit is a unit for setting timing from writing of registration mark 12A to the start of image writing in the secondary scanning direction with regard to the first image-wise exposure (by means of laser scanning exposure unit 120) and timing from from reference detection value of registration mark 12A to the start of image writing in the secondary scanning direction with regard to the second to the fourth image-wise exposures (by means of laser scanning exposure units 220, 320 and 420). A primary area counter is a counter for deviating the primary scanning direction and primary count setting unit is a unit for setting timing from writing of registration mark 12A to the start of image writing in the primary scanning direction with regard to the first image-wise exposure (by means of laser scanning exposure unit 120) and timing from end point reference detection value of registration mark 12A to the start of image writing in the primary scanning direction with regard to the second to the fourth image-wise exposures (by means of laser scanning exposure units 220, 320 and 420).

A plurality of scanning exposure beams (usually 3 beams) located at downstream side from the primary scanning line L1 irradiate respectively the visualized secondary scanning registration mark 12B during scanning and each reflected light therefrom is received by each of photosensors PS22, PS23 and PS24. Thereby, the speed on the photoreceptor belt 12 and the start timing in the secondary direction are controlled.

Namely, an average speed of the surface of a photoreceptor can be calculated by measuring, by the use of photosensors PS22, PS23 and PS24, the period of time required for the secondary registration mark 12B to pass through the distance between primary scanning lines $A_2$ and $A_3$ before image forming, and the speed is corrected and compensated to the predetermined value.

During image forming, the first primary scanning line L1 conducts, in a known method, imagewise exposure after counting $dT_V'$ with a secondary area counter in the case of position detection in the secondary scanning direction by means of photosensor PS1, or after counting $dT_H'$ with a primary area counting unit in the case of the primary scanning direction, thus the first image (for example, a yellow image) is formed by the developing unit 130.

Next, with regard to a laser beam for writing in the aforementioned primary scanning line L2, the period of time from the start of writing of the secondary scanning registration mark 12B by means of the first laser for writing to the time when signals of detection of the secondary scanning registration mark 12B are generated after the reflected light by means of the second laser beam for writing is received by photosensor PS22 is measured and the result of the measurement is compared with the predetermined value established in advance, thus the start of writing in the secondary scanning direction is compensated.

In the primary scanning direction, the reflected light of the second laser beam for writing is received by photosensor PS22, and writing of the second image (for example, a magenta image) by means of the primary scanning line L2 is started after the lapse of a certain time $dT_H$ established in advance from the generation of detection signals of registration mark 12A.

After the foregoing, the primary scanning line L3 irradiates the aforementioned registration marks 12A and 12B, then position detection signals are generated, and the time for passing through the distance between both primary scanning lines L2 and L3 mentioned above is counted, thus the timing for writing image is controlled in the same manner as in the previous example.

In the present example, the sequence of toner colors in the developing units 130–430 is not limited only to Y, M, C and K, and it is naturally possible to load black (K) toner in the first developing unit 130 for easy detection of the first development registration mark 1A.

Since the photosensors PS1–PS4 mentioned above can be positioned closely to the surface of the photoreceptor belt 1, detection accuracy for controlling the time of start writing in the secondary scanning direction is high, and the photosensors have only to be provided on one side of the photoreceptor belt 1. Therefore, the space for photosensors may be minimized. Incidentally, the registration marks 12A, an 12B and photosensors PS2, PS3 and PS4 are not limited only to detection of reflected light of a laser beam, but they may also be applied to detection of reflected light of primary scanning exposure wherein an LED array is used.

Figure 9:
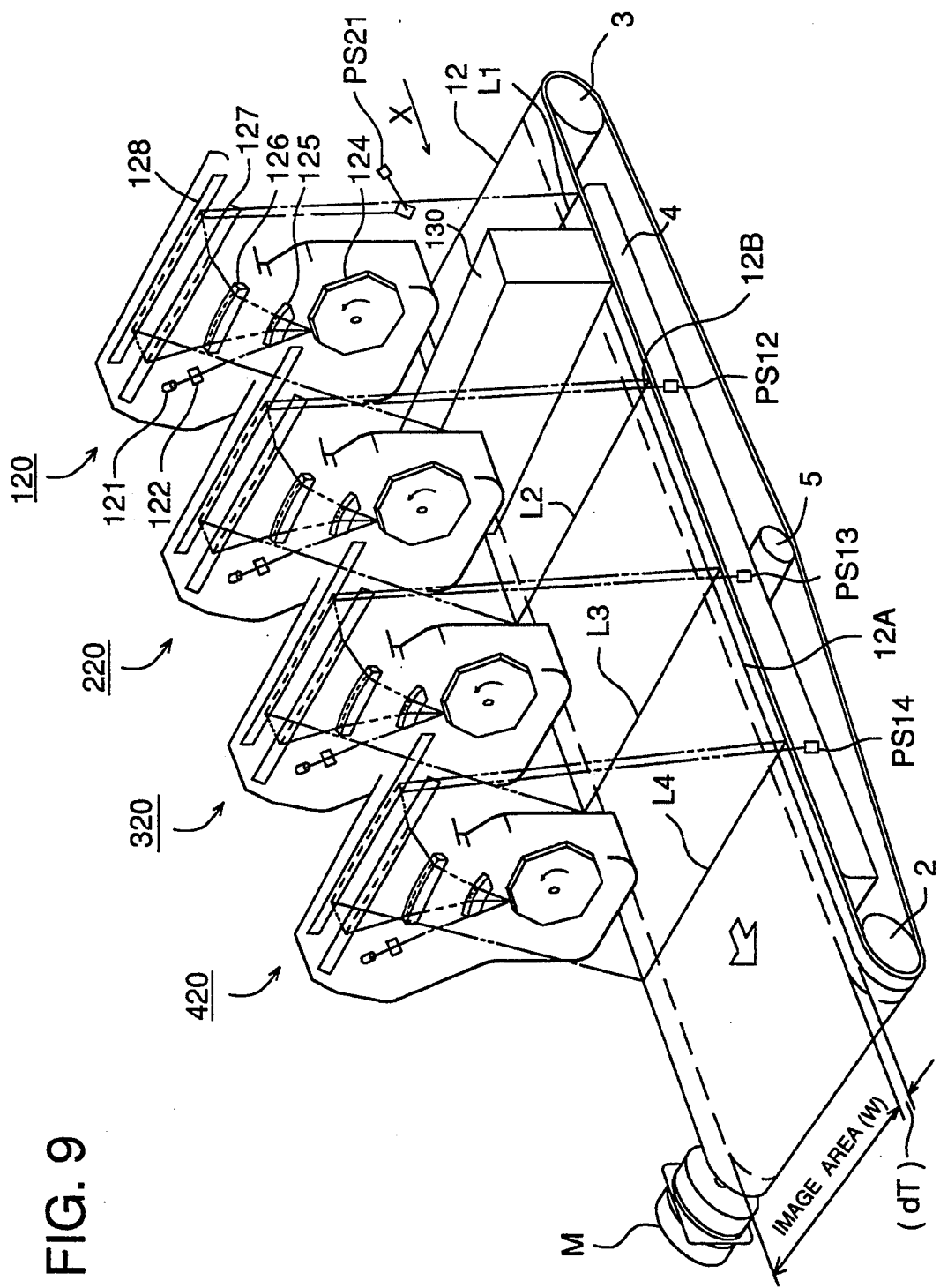
FIG. 9 is a perspective view of the fourth example of a scanning exposure unit.

FIG. 9 shows the fourth example of color image forming.

In this fourth example, a support in the vicinity of a position of the registration mark 12A provided at the end side of a non-image area on the photoreceptor belt 12 is made to be a transparent zone, and developing unit 130 corresponding, in terms of position, to the extremely upstream position of the transparent zone, namely to the first primary scanning beam L1 contains developer whose toner can transmit a primary scanning laser beam. The registration mark (developed pattern) 12B visualized by the developing unit 130 is irradiated by primary scanning beam L2 and transmits the beam, and the transmitted light is detected by photosensor PS12 so that the detection signal may become a base in the primary scanning direction for image signals after predetermined period of time dT, in the same manner as in the previous third example.

With regard to primary scanning beams L3 and L4, image writing is conducted by detection signals of the aforementioned registration mark 12B, in the same manner as in the foregoing.

Figure 10:
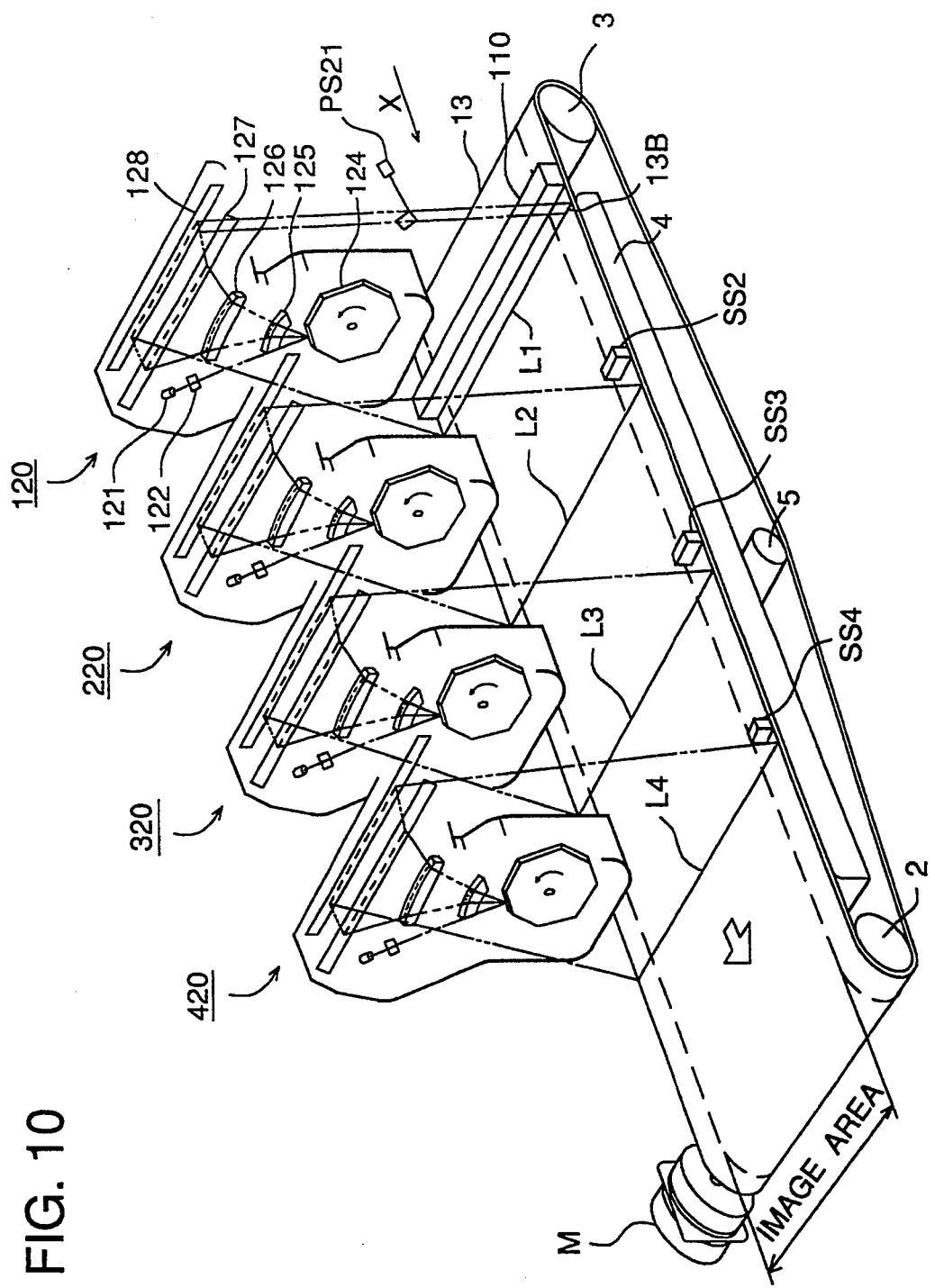
FIG. 10 is a perspective view of the fifth example of a scanning exposure unit.

FIG. 10 is a perspective view showing, as the fifth example of the invention, photoreceptor belt 11 on which potential variation is formed and an optical path of a scanning exposure unit, as the fifth example of the invention.

On photoreceptor belt 13 whose entire surface has been charged by carging unit 110 in advance, there is formed by primary scanning beam L1 latent image pattern 13B that is a short straight line in the primary scanning direction at a predetermined position on a non-image area thereof. Due to the formation of the latent image pattern 13B, variation in surface potential on the photoreceptor belt 13 is caused.

Surface potential sensors SS2, SS3 and SS4 are affixed so that each of them may be positioned at the upstream side of each of primary scanning beams L2, L3 and L4 in the moving direction of the photoreceptor belt 13. When the secondary scanning movement (in X direction) of the photoreceptor belt 13 makes the latent image pattern 13B to pass through the surface potential sensor SS2 located immediately ahead of the second primary scanning beam L2, potential variation on the latent image pattern 13B is detected by the surface potential sensor SS2, registration mark position signals are generated, the moving speed of the surface of the photoreceptor belt 13 is compensated, and starting time for image writing is also compensated. With regard to primary scanning lines L3 and L4, image writing is conducted after the reference position of the latent image pattern 13B is detected by each of surface potential sensors SS3 and SS4, which is the same as the foregoing.

As described in the first example through the fifth example explained above, laser scanning exposure units 120, 220, 320 and 420 are arranged first, then focusing of a laser beam is adjusted, and a registration mark, a toner pattern and surface potential variation for each secondary scanning line are detected by sensors regardless of variation in diameters of driving rollers, belt thickness and in temperature. Thereby, speed change between secondary scanning lines is detected and compensated, image writing timing control and driving control are carried out for fine adjustment. Thus, delicate color slip in the order of width of one scanning or of width of one dot may be compensated extremely accurately for image forming. Especially in the case of color image forming wherein images are superimposed, excellent effect is shown for the remarkable improvement in quality of color images.

Next, the sixth, seventh and eighth examples of the invention will be explained as follows, referring to FIG. 1 and FIGS. 11–15 attached hereto.

The process in the primary scanning direction for color image forming by means of an image forming apparatus having constitution shown in FIG. 1 is represented by the foregoing.

With regard to the secondary scanning direction, on the other hand, modulation of semiconductor laser 121 by means of image signals is started after the lapse of a certain time established in advance from the generation of signals made in the apparatus main body for the start of image forming, and the position of the start of image forming in the secondary scanning direction is determined, although the details thereof will be stated later. After the start of scanning, the fixed position in the primary scanning direction of the first semiconductor laser 121 is detected by PS1, modulation of semiconductor laser 121 by means of the first color image signals is started after the lapse of a certain period of time with the detected signals as a base, and modulated laser beam scans the surface of the photoreceptor belt 1. Therefore, the primary scanning by means of a laser beam and the secondary scanning by means of conveyance of the photoreceptor belt 1 form a latent image corresponding to the first color on the surface of the photoreceptor belt 1 charged uniformly. When image forming is started, in this case, the semiconductor laser 121 forms a latent image which serves as a registration mark at the position that is immediately ahead of the position of the start of image forming and is a specific position on the photoreceptor belt 1. The latent image is then developed by the developing unit 130 containing therein yellow toner, and thereby a yellow toner image is formed on the surface of the photoreceptor belt 1. After that, the photoreceptor belt 1 is conveyed while it is holding thereon the yellow toner image, for entering the following image forming process for the second color.

Namely, the photoreceptor belt 1 on which a yellow toner image is formed advances to the position of the next charging unit 210 where it is charged by the charging unit 210. Then, the specific position (registration mark position) on the photoreceptor belt 1 is detected by a laser beam of the second semiconductor laser, and modulation of semiconductor laser of laser scanning exposure unit 220 by means of the second image signals is started with the detected signals as a base. A laser beam generated from semiconductor laser is led, through a collimation lens, to a polygon mirror rotated by a driving motor for rotating scanning and then projected onto the surface of the photoreceptor belt 1 charged uniformly to a predetermined charge by the charging unit 210, through an fθ lens and a cylindrical lens, thus a latent image is formed on the photoreceptor belt 1. The latent image is then developed by developing unit 230 containing therein magenta toner as a second color. A magenta toner image is formed so that it is superimposed on the yellow toner image which has already been formed. In the same way, a cyan toner image as a third color and further a black toner image are superimposed on the surface of the photoreceptor belt 1.

The sixth example of the invention wherein a position, in the secondary scanning direction, of photoreceptor belt 1 provided in a color image forming apparatus of the invention is detected and deviation of the position is compensated for registration of a plurality of images, will be explained in detail next.

Figure 11:
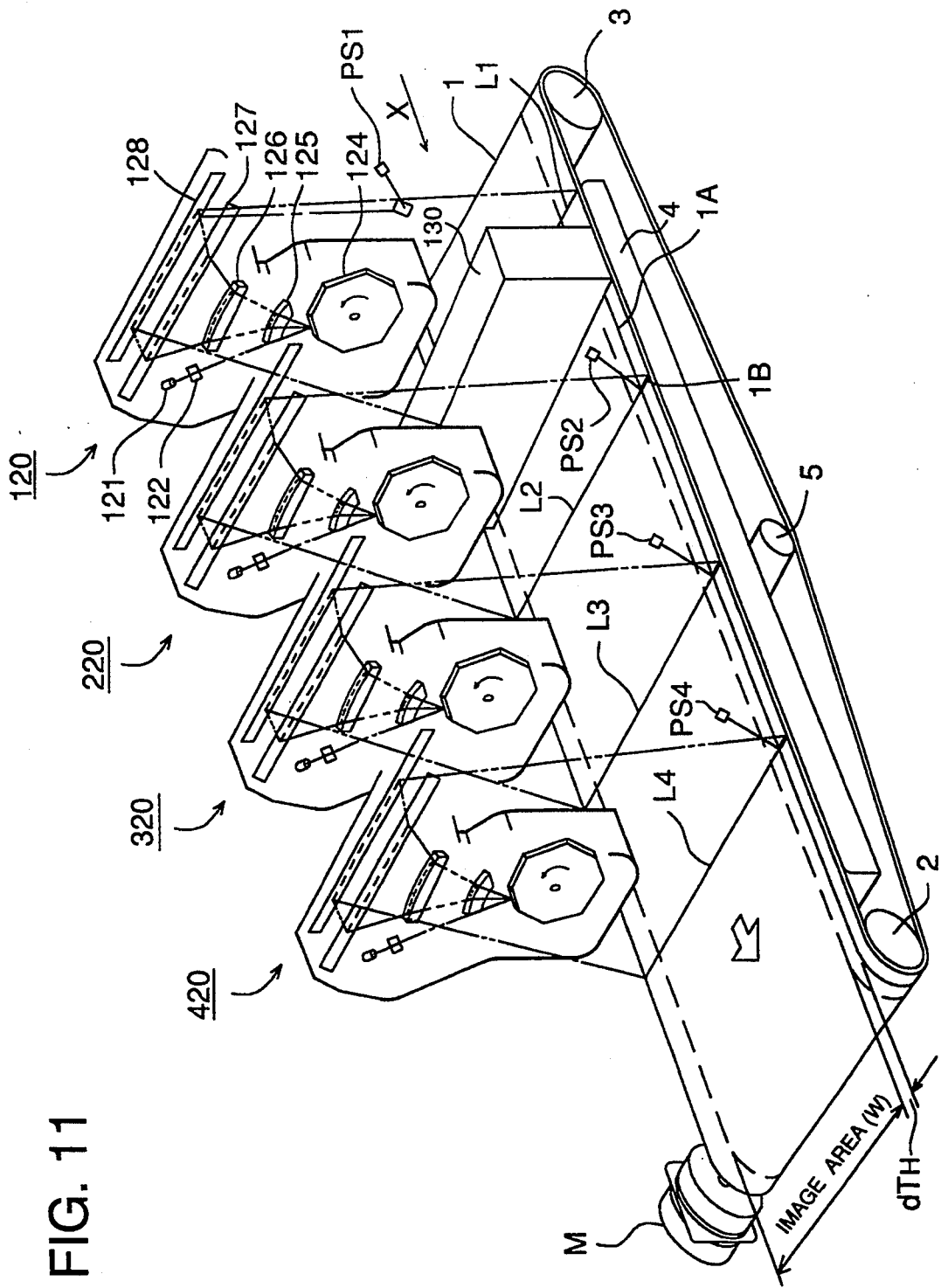
FIG. 11 is a perspective view showing the sixth example of a laser scanning exposure unit in a color image forming apparatus of the invention.

FIG. 11 is a perspective view showing the aforementioned belt-shaped image forming member and an optical path of a laser scanning exposure unit. A laser beam of the laser scanning exposure unit 120 forms a latent image of the exposure scanning line L1 on the photoreceptor belt 1 charged in advance, and prior to this, latent images of registration marks 1A and 1B are formed in the vicinity of the side end of a non-image area. The latent images of registration marks 1A and 1B are developed by the first developing unit 130 to be visible registration marks 1A and 1B. PS1 is a beam detector (photosensor) which receives the laser beam coming from rotating polygon mirror 124 through f$\theta$ lens 125 and generates output signals and further generates, by means of a beam detect detection circuit, beam detect signals in a shape of a square wave based on an arbitrary set value.

After the generation of beam detect signals, registration marks 1A and 1B are subjected to exposure by means of a laser beam after the lapse of time predetermined by a reference line count setting unit, thus latent images are formed.

Figure 12:
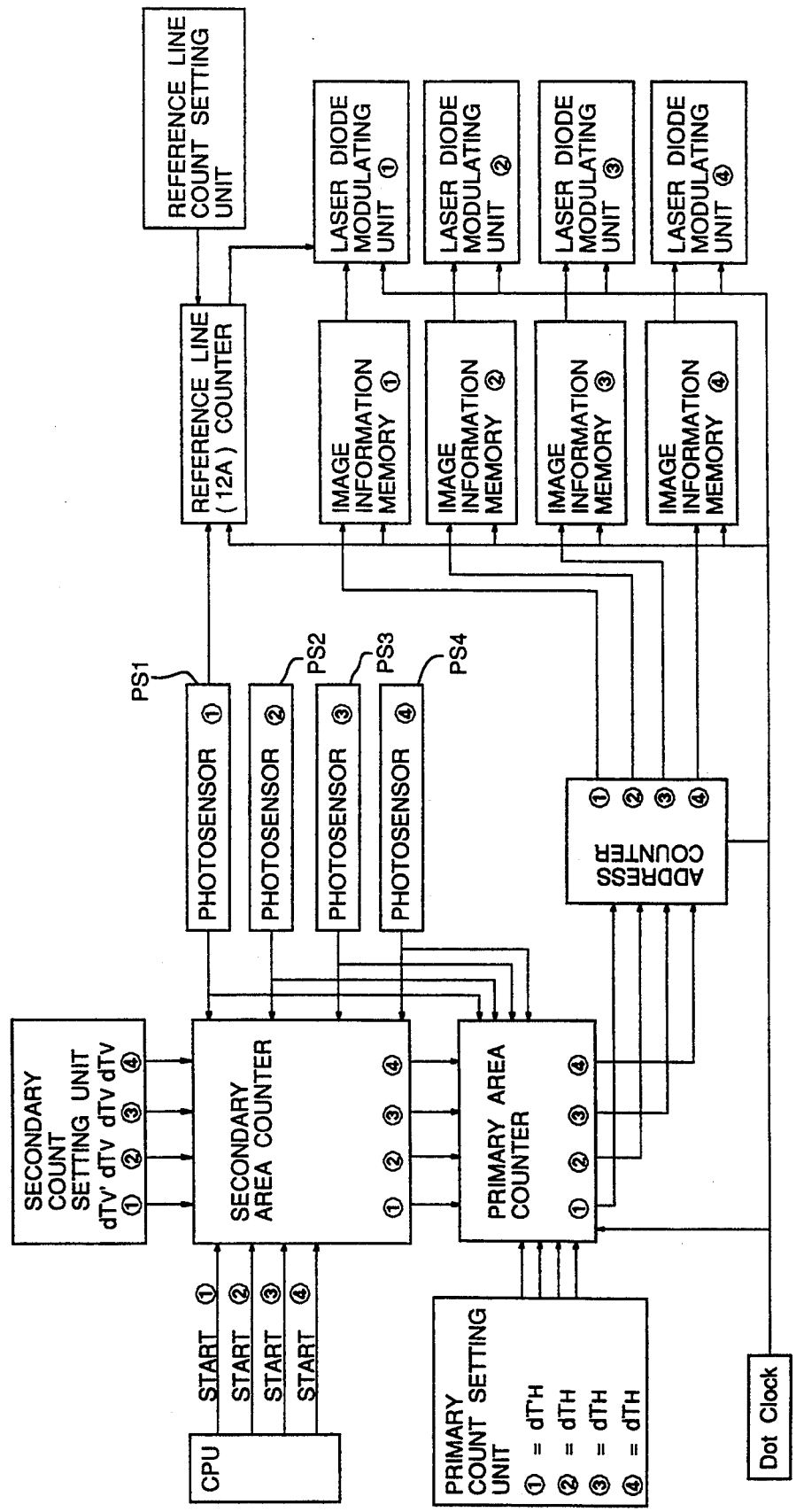
FIG. 12 is a control block diagram of the laser scanning exposure unit mentioned above.

FIG. 12 is a block diagram of a scanning exposure compensation that prevents deviation of a laser beam in the primary and secondary scanning directions. A secondary area counter, in this case, is a counter that deviates a secondary scanning direction, a secondary count setting unit is a unit to set timing from writing of registration mark 1B to the start of image writing in the secondary scanning direction with regard to the first imagewise exposure (laser scanning exposure unit 120) and timing from reference detection value of registration mark 1B to the start of image writing in the secondary scanning direction with regard to the second through the fourth imagewise exposures (laser scanning exposure units 220, 320 and 420), while, a primary area counter is a counter for moving the primary scanning direction, and a primary count setting unit is a unit to set timing from writing of registration mark 1A to the start of image writing in the primary scanning direction with regard to the first imagewise exposure (laser scanning exposure unit 120) and timing from reference detection value of registration mark 1A to the start of image writing in the primary scanning direction with regard to the second through the fourth imagewise exposures (laser scanning exposure units 220, 320 and 420).

A plurality of scanning exposure beams (usually 3 beams) located at downstream side from the primary scanning line L1 irradiate respectively the visualized registration marks 1A and 1B during scanning and each reflected light therefrom is received by each of photosensors PS2, PS3 and PS4. Thereby, the starting positions in the primary scanning direction and the secondary scanning direction are detected and controlled.

Namely, the first primary scanning line L1 conducts, in a known method, imagewise exposure after counting $dT_V'$ with a secondary area counter in the case of position detection in the secondary scanning direction by means of photosensor PS1, or after counting $dT_H'$ with a primary area counting unit in the case of the primary scanning direction, thus the first image (for example, a yellow image) is formed by the developing unit 130.

Next, a laser beam in the primary scanning line L2 irradiates registration marks 1A and 1B developed and formed on the rotating photoreceptor belt 1, and reflected light therefrom is received by photosensor PS2, and after the generation of detection signals of registration marks 1A and 1B, second image (for example, a magenta image) writing by means of primary scanning line L2 is started after the lapse of a certain period of time $dT_V$ in the secondary scanning direction and after the lapse of a certain primary scanning timing $dT_H$ in the primary scanning direction.

In the same way as in the foregoing, each time registration marks 1A and 1B visualized with developer toner on the photoreceptor belt 1 pass through scanning lines L3 and L4, the registration marks 1A and 1B are subjected to exposure of primary scanning lines L3 and L4 to be irradiated thereby, and position detection signals are generated by photosensor PS2, thus, images each having a different color (cyan, black) are written at a constant position on the photoreceptor belt 1 to be superimposed.

Further, differently from the case wherein an exclusive photocoupler is used, a laser beam itself in which a light source is used for image forming is used. Therefore, a photosensor has only to be on a level of an inexpensive phototransistor, and a reflected light of the laser beam has only to be arranged to enter the photosensor, and nothing higher than the mechanical positioning accuracy is required. Incidentally, the registration marks 1A and 1B as well as photosensors PS2, PS3 and PS4 are not limited only to reflected light detection but they may also be applied to reflected light detection of primary scanning exposure employing an LED array.

Figure 13:
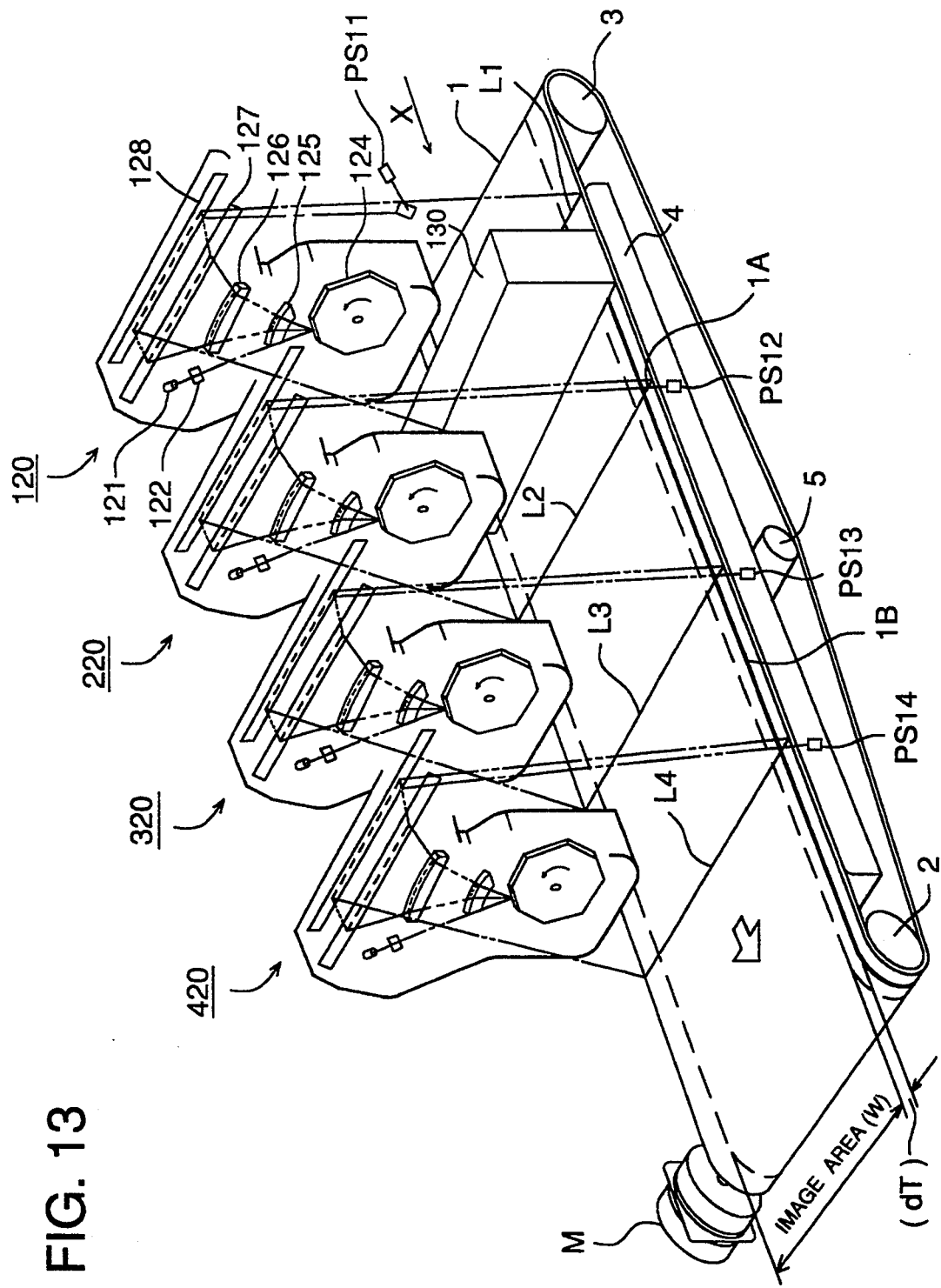
FIG. 13 is a perspective view of the seventh example of a laser scanning exposure unit in the invention, FIG. 14 a general structural diagram of the eighth example of a color image forming apparatus of the invention.

FIG. 13 shows a laser scanning exposure unit in the seventh example of a color image forming apparatus of the invention.

In this example, a support in the vicinity of a position of the registration mark 1A provided at the end side of a non-image area on the photoreceptor belt 1 is made to be a transparent zone, and developing unit 130 corresponding, in terms of position, to the extremely upstream position of the transparent zone, namely to the first primary scanning beam L1 contains developer whose toner can transmit a primary scanning laser beam. The registration mark (developed pattern) 1A visualized by the developing unit 130 is irradiated by primary scanning beam L2 and transmits the beam, and the transmitted light is detected by photosensor PS12 so that the detection signal may become a base in the primary scanning direction for image signals after predetermined period of time dT, in the same manner as in the previous sixth example.

With regard to primary scanning beams L3 and L4, image writing is conducted by detection signals of the aforementioned registration mark 1A, in the same manner as in the foregoing.

Figure 14:
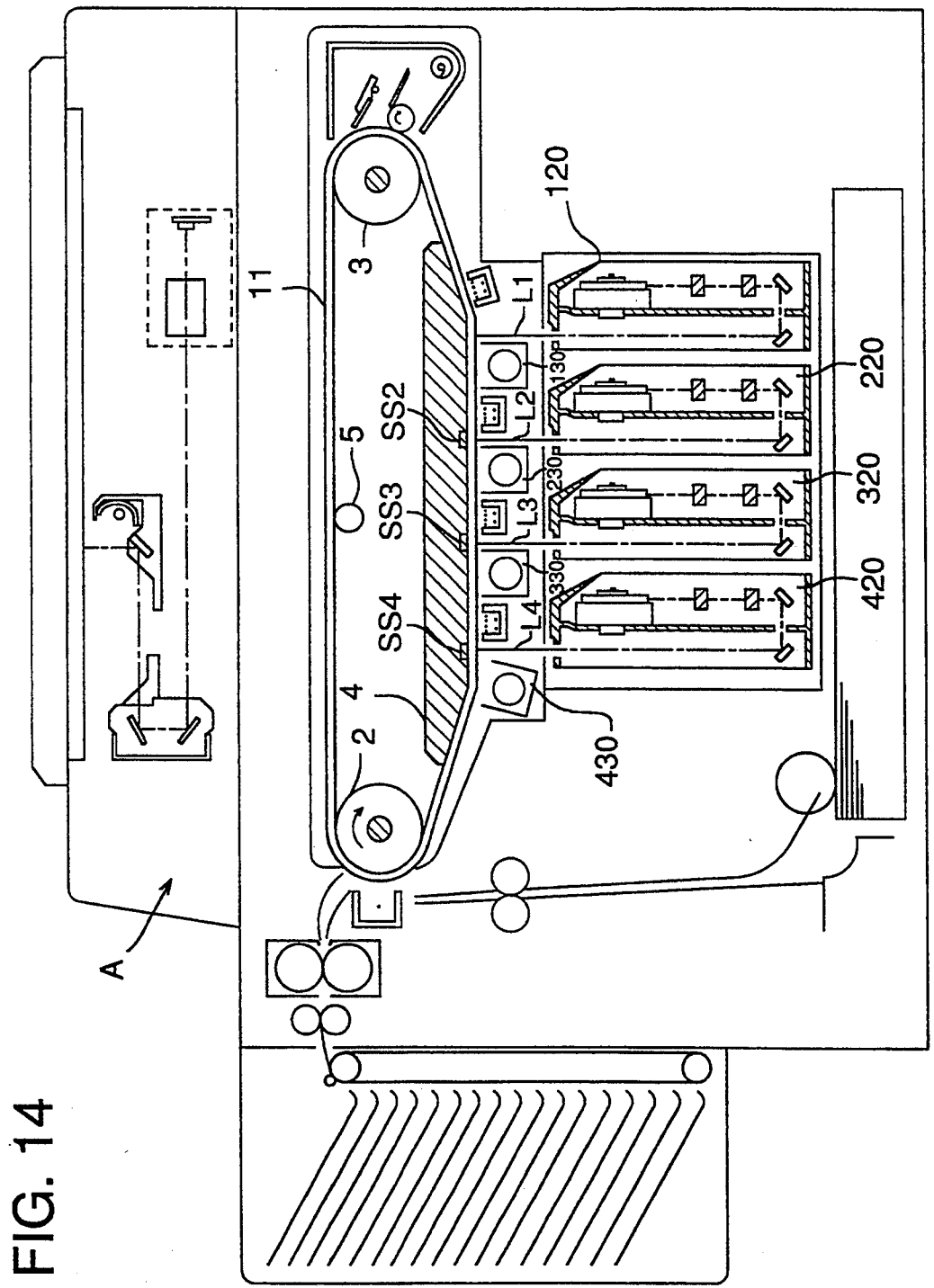
Figure 15:
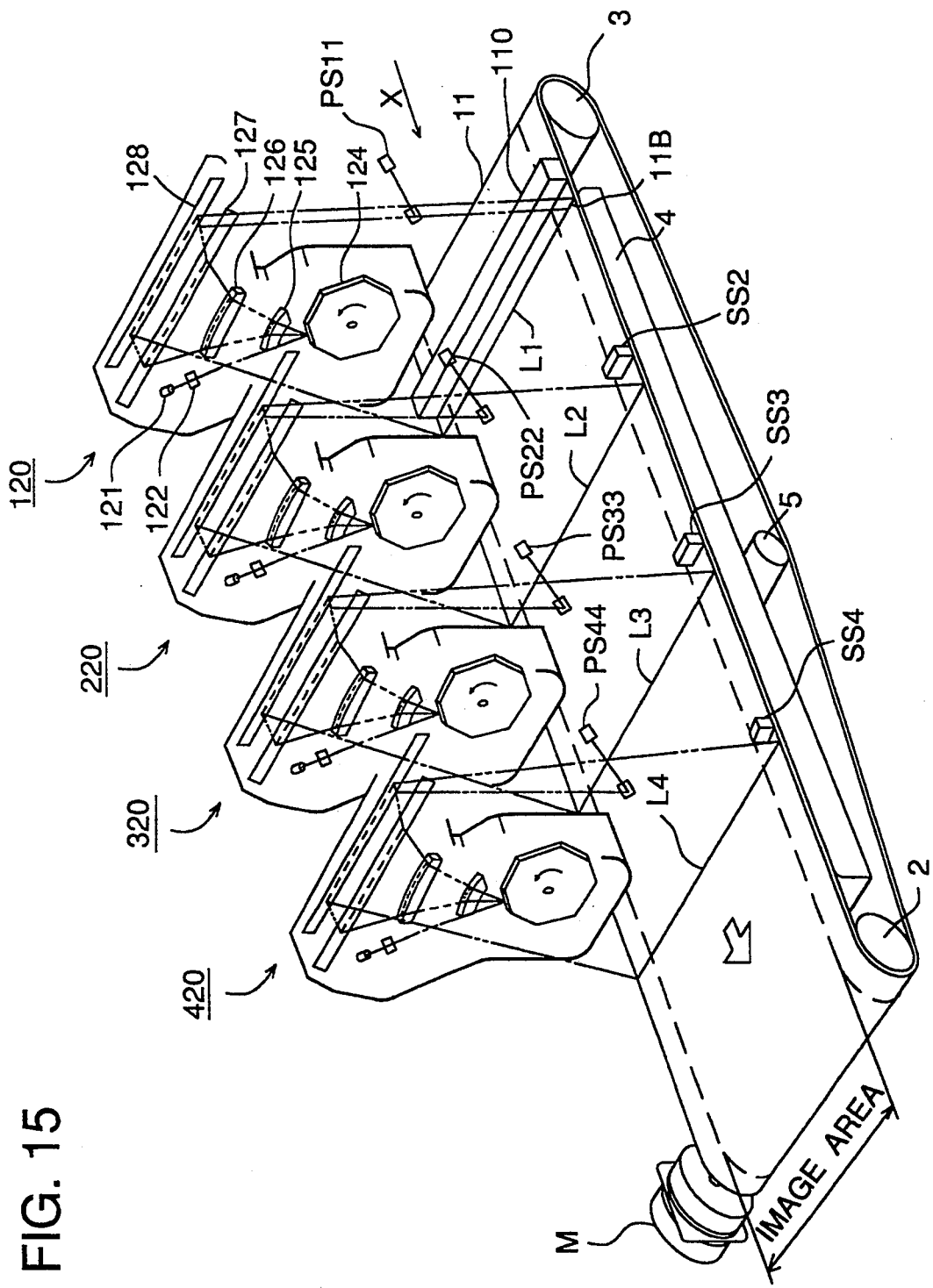
FIG. 15 is a perspective view of a laser scanning exposure unit in the eighth example of a color image forming apparatus mentioned above.

FIG. 14 shows, as the eighth example of the invention, a general structural diagram of a color copying machine equipped with photoreceptor belt 11 on which potential variation is formed and an image writing system A on the top thereof. FIG. 15 is a perspective view showing the photoreceptor belt and an optical path of an exposure unit.

On photoreceptor belt 11 whose entire surface has been charged by charging unit 110 in advance, there is formed by primary scanning beam L1 latent image pattern 11B that is a short straight line in the primary scanning direction at a predetermined position on a non-image area thereof. Due to the formation of the latent image pattern 11B, variation in surface potential on the photoreceptor belt 11 is caused.

Each of exposure units is equipped with each of sensors PS11, PS22, PS33 and PS44 for controlling a position of the primary scanning direction of each laser beam.

Surface potential sensors SS2, SS3 and SS4 are affixed so that each of them may be positioned at the upstream side of each of primary scanning beams L2, L3 and L4 in the moving direction of the photoreceptor. When the secondary scanning movement (in X direction) of the photoreceptor belt 11 makes the latent image pattern 11B to pass through the surface potential sensor SS2 located immediately ahead of the second primary scanning beam L2, potential variation on the latent image pattern 11B is detected by the surface potential sensor SS2, registration mark position signals are generated, and writing of the second image is started after the lapse of a certain period of time $dT_V$ and after a certain period of time $dT_H$ from the detection by means of beam detector PS22 in the primary scanning direction. With regard to primary scanning lines L3 and L4, image writing is conducted after the reference position of the latent image pattern 11B is detected by each of surface potential sensors SS3 and SS4, which is the same as the foregoing.

As described in the sixth, seventh and eighth examples explained above, laser scanning exposure units 120, 220, 320 and 420 are arranged first in an ordinary mechanical accuracy, then focusing of a laser beam is adjusted, and even when the conveyance speed of the rotating photoreceptor belt 1 or 11 may be changed during image writing, setting of a reference position and a predetermined counting can be conducted by detecting registration mark 1B and latent image pattern 11B with a sensor for each secondary scanning line. Thus, delicate color slip in the order of width of one scanning or of width of one dot may be compensated extremely accurately for image forming. Especially in the case of color image forming wherein images are superimposed, excellent effect is shown for the remarkable improvement in quality of color images.

The ninth and tenth examples of the invention will be explained as follows, referring to FIG. 16 through FIG. 19.

The foregoing is a process in the primary scanning direction in color image forming by means of an image forming apparatus as shown in FIG. 1.

With regard to the secondary scanning direction, on the other hand, registration mark 1B corresponding to the specific position on the photoreceptor belt 1 is detected by a photosensor, and based on the detected signals, modulation of semiconductor laser 121 by means of image signals is started and a primary scanning line in the secondary scanning direction is determined. The details thereof will be discussed below. After the start of scanning, the fixed position in the primary scanning direction is determined by a laser beam of the first semiconductor laser 121, modulation of semiconductor laser 121 by means of the first color image signals is started based on the detected signals, and modulated laser beam scans the surface of the photoreceptor belt 1. Therefore, the primary scanning by means of a laser beam and the secondary scanning by means of conveyance of the photoreceptor belt 1 form a latent image corresponding to the first color on the surface of the photoreceptor belt 1 charged uniformly. The latent image is then developed by the developing unit 130 containing therein yellow toner, and thereby a yellow toner image is formed on the surface of the photoreceptor belt 1. After that, the photoreceptor belt 1 is conveyed while it is holding thereon the yellow toner image, for entering the following image forming process for the second color.

Namely, the photoreceptor belt 1 on which a yellow toner image is formed advances to the position of the next charging unit 210 where it is charged by the charging unit 210 as in the case of image signals of the first color mentioned above. Then, the specific position on the photoreceptor belt 1 is detected by a laser beam of the second semiconductor laser, and modulation of semiconductor laser of laser scanning exposure unit 220 by means of the second image signals is started with the detected signals as a base. A laser beam generated from semiconductor laser is led, through a collimation lens, to a polygon mirror rotated by a driving motor for rotating scanning and then projected onto the surface of the photoreceptor belt 1 charged uniformly to a predetermined charge by the charging unit 210, through an $f\theta$ lens and a cylindrical lens, thus a latent image is formed on the photoreceptor belt 1. The latent image is then developed by developing unit 230 containing therein magenta toner as a second color. A magenta toner image is formed so that it is superimposed on the yellow toner image which has already been formed. In the same way, a cyan toner image as a third color and further a black toner image are superimposed on the surface of the photoreceptor belt 1.

The compensation operation in the invention wherein a position, in the secondary scanning direction, of photoreceptor belt 1 is detected and deviation of the position is compensated for registration of a plurality of images, will be explained in detail next.

Figure 16:
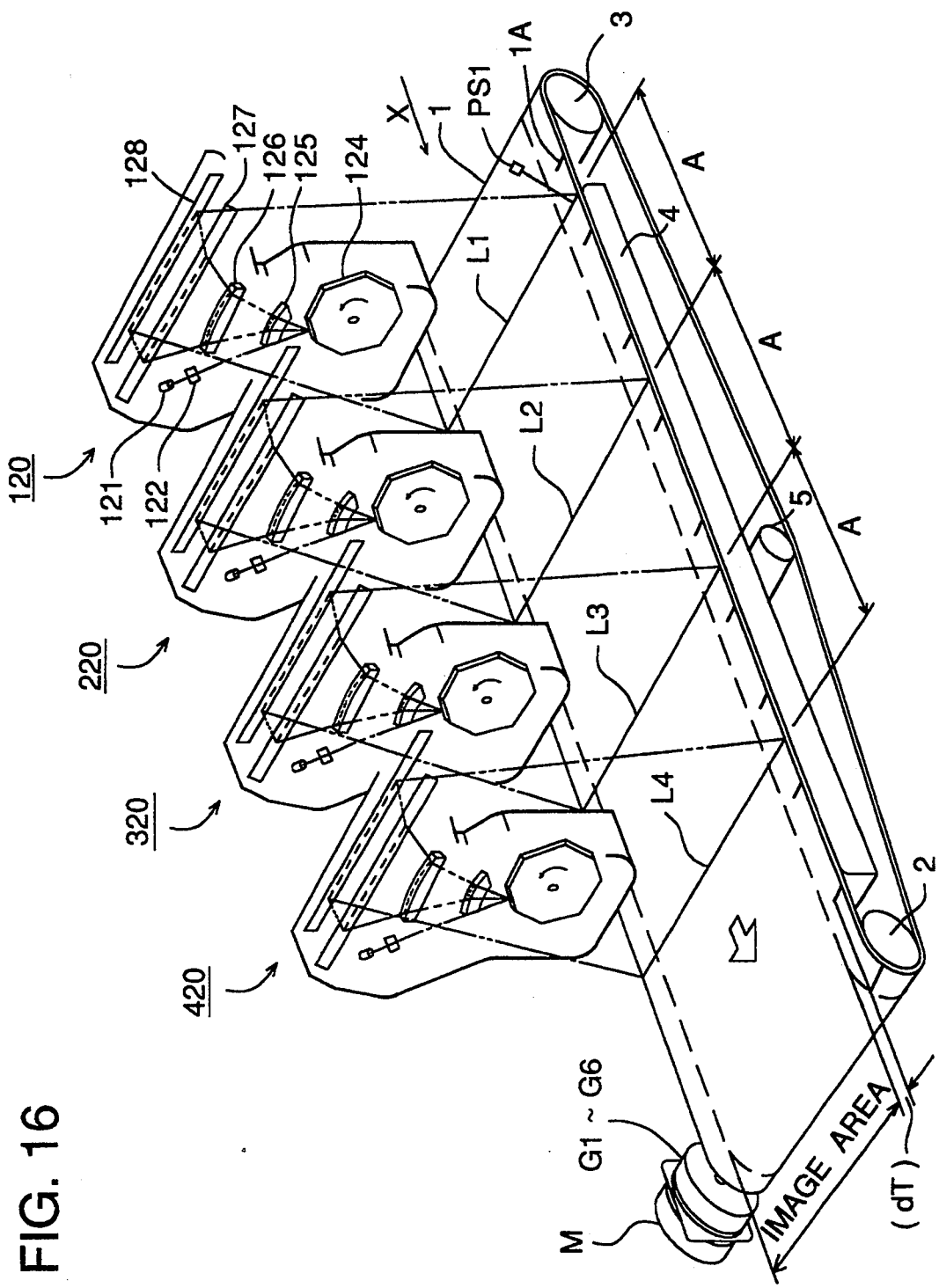
FIG. 16 is a perspective view showing the ninth example of a laser scanning exposure unit in a color image forming apparatus of the invention.

As shown in FIG. 16, a plurality of registration marks 1A of the invention formed in advance by means of printing or the like are provided in parallel with the secondary scanning direction X in the vicinity of the side end that is out of an image area on the photoreceptive surface of photoreceptor belt 1. The registration marks 1A are references in the secondary scanning direction each of which determines each start timing for exposure by means of each primary scanning line L1, L2, l3 or L4 in the primary scanning direction each made by a laser beam.

Photosensor PS1 is affixed at the position which is located over the point where the primary scanning line L1 and the moving registration mark 1A agree in terms of position each other (See FIG. 2.), and the reflected light from the registration mark 1A by means of the primary scanning line L1 of a laser beam is received by the photosensor PS1.

Figure 17:
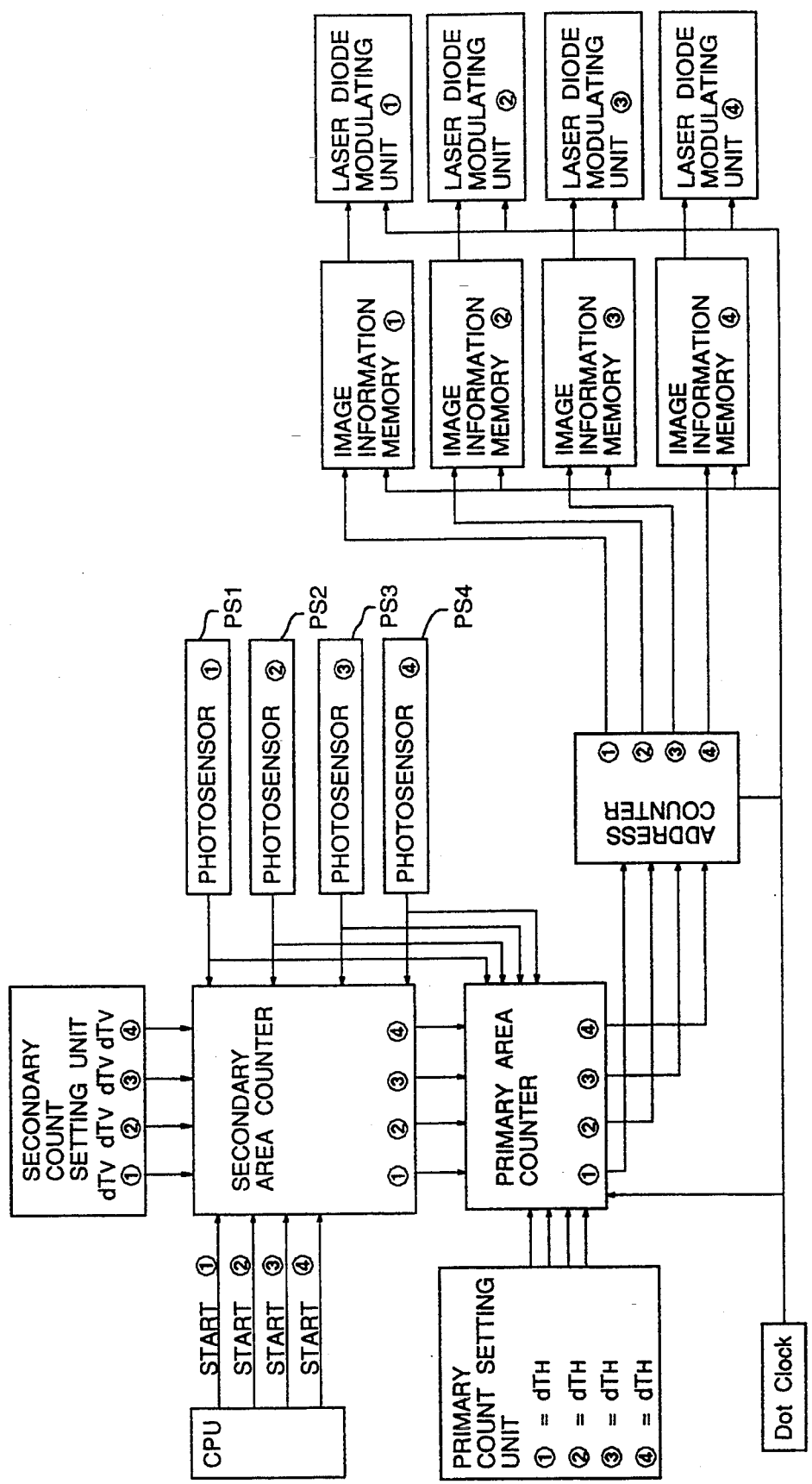
FIG. 17 is a control block diagram of the aforementioned laser scanning exposure unit.

FIG. 17 is a block diagram of a scanning exposure compensation that prevents deviation of a laser beam in the primary and secondary scanning directions. A secondary area counter, in this case, is a counter that deviates a secondary scanning direction, a secondary count setting unit is a unit to set timing from reference detection value of registration mark 1A to the start of image writing in the secondary scanning direction, while, a primary area counter is a counter for moving the primary scanning direction, and a primary count setting unit is a unit to set timing from end point reference detection value of registration mark 1A to the start of image writing in the primary scanning direction.

A laser beam for writing in the primary scanning line L1 irradiates registration mark 1A formed on the rotating photoreceptor belt 1 and the reflected light therefrom is received by photosensor PS1, and after the generation of detection signals of the registration mark 1A, writing of the first image (for example, a yellow image) by means of the primary scanning line L1 is started after the lapse of a certain period of time $dT_H$ in the primary scanning direction, and after the lapse of a certain period of time $dT_V$ in the secondary scanning direction.

After the detection of the registration mark 1A, writing of the second image (for example, a magenta image) is started after counting predetermined timing from the reference detection position, namely after counting the number of lines for the first scanning beam.

Ib the same manner, the third image (for example, a cyan image) and the fourth image (for example, a black image) are respectively written after a predetermined count from the reference detection position of the registration mark 1A.

Incidentally, it is also possible to employ a method wherein photosensors PS2, PS3 and PS4 are respectively affixed at a position corresponding to that for the photosensor PS1 over the non-image area for the primary scanning lines L2, L3 and L4, and the registration mark 1A formed on the photoreceptor belt 1 passing through the primary scanning line L1 is detected in terms of passing position by primary scanning lines L2, L3 and L4 so that the writing position in the secondary scanning direction for each color image may agree.

Operation of a color image forming apparatus in each of the ninth and tenth examples will be explained as follows, referring to FIGS. 1, 16 and 17.

After the power supply, photoreceptor belt 1 is conveyed in the secondary scanning direction X by the two rotating rollers 2 and 3 which rotate clockwise at the constant speed that is one fifth of the constant linear speed for image forming and a laser is lit on each of laser scanning exposure units 120-420 for the start of scanning. By utilizing that registration mark 1A corresponding to the specific position on the photoreceptor belt 1 moves in the secondary scanning direction X, the time required for the registration mark 1A to move along each distance between the primary scanning lines L1, L2, L3 and L4 is measured. In the method for the measurement, a laser beam of the laser scanning exposure unit 120 irradiates the registration mark 1A and detection signals therefrom coming through the detection by means of photosensor PS1 are generated. During the period from the generation of the detection signals mentioned above to the moment when each of laser scanning exposure units 220, 320 and 420 irradiates the registration mark 1A and the reflected light therefrom is detected by each of photosensors PS2, PS3 and PS4, the number of occurrence that a laser beam of the laser scanning exposure unit 120 irradiates registration mark 1B and detection signals therefrom detected by the photosensor PS1 are generated is counted. After this, the process enters the state of standby.

During the operation of printing, the surface of the photoreceptor is charged uniformly by charging unit 110 while the photoreceptor belt 1 is being conveyed at the speed of image forming. By utilizing the laser beam used for imagewise exposure by means of the exposure unit 120 mentioned above, the registration mark 1B is detected by the photosensor PS1 and with the detection signals as a reference, imagewise exposure for one scanning line L1 is conducted. Thus, imagewise exposure may be started constantly from the registration mark 1B at a predetermined position on the photoreceptor belt 1.

After that, the laser scanning exposure unit 120 conducts exposure scanning based on yellow data equivalent to one image screen, and forms a latent image at a predetermined position on the photoreceptor belt 1. The latent image is developed by developing unit 130 with yellow toner.

For image forming following the foregoing based on magenta data, cyan data and black data, each of exposure units 220, 320 and 420 starts exposure after compensation of the deviation to the secondary scanning direction based upon the predetermined number of count after detection of a reference position of the registration mark 1A on the photoreceptor belt 1, thus, imagewise exposure may be started constantly from a predetermined position on the photoreceptor belt 1. The compensation of the deviation to the secondary scanning direction is conducted by starting the imagewise exposure after counting the time required for the registration mark 1B to move along each distance between scanning lines divided by 1/5. This eliminates necessity for positioning a plurality of exposure units in high mechanical accuracy, and prevents color slips by avoiding that the time for starting exposure for latent image formation is deviated when repeating latent image formation corresponding in quantity to the number of colors used for image forming.

Incidentally, it is preferable that adjustment of primary scanning width (adjustment of dot clock) is conducted before detection of compensation value for the deviation to the secondary scanning direction that precedes the state of standby.

Figure 18:
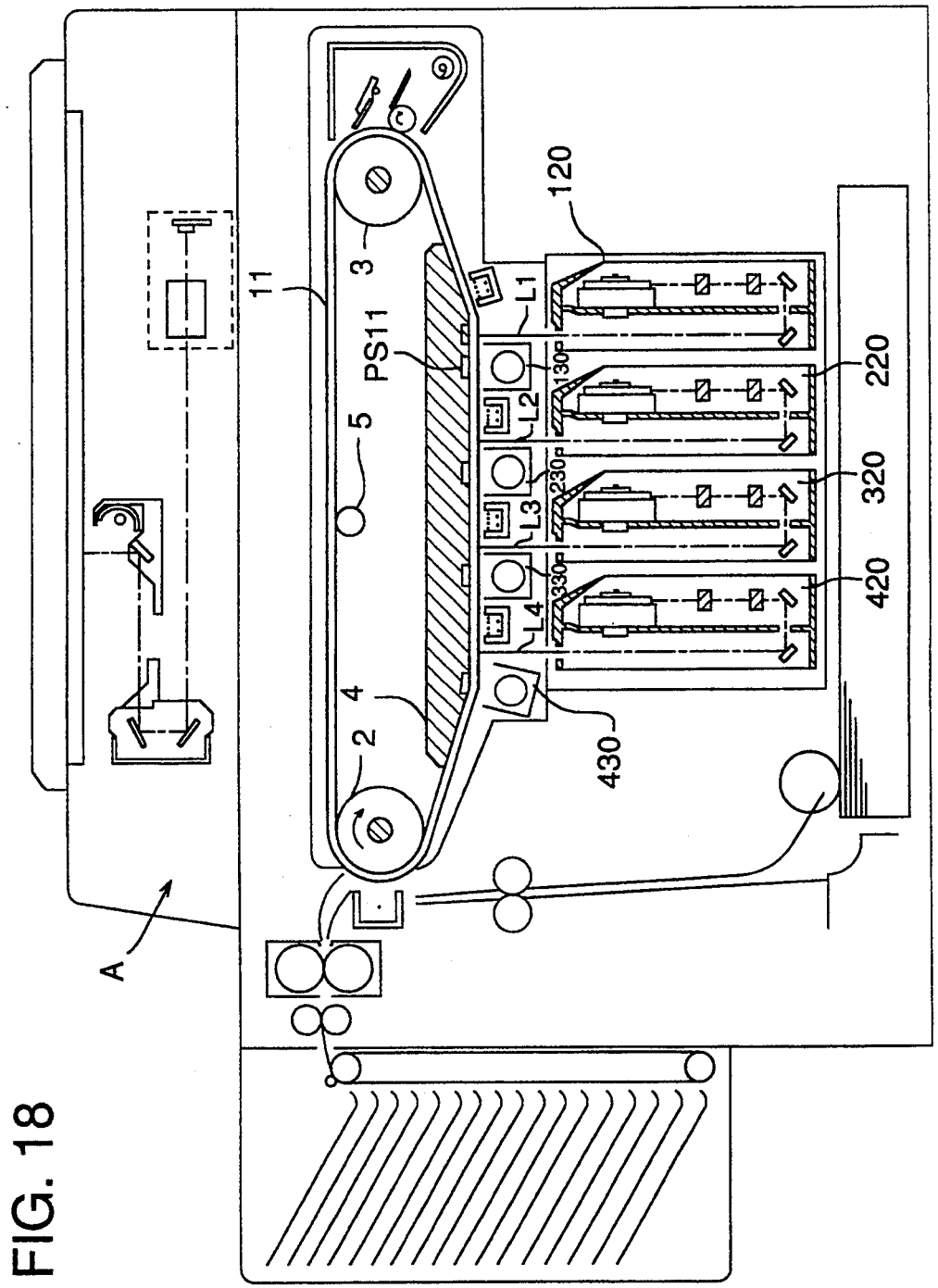
FIG. 18 is a general structural diagram of the tenth example of a color image forming apparatus related to the invention.

FIG. 18 shows a general structural diagram of a color copying machine equipped, as the tenth example of the invention, with photoreceptor belt 11 on which a light-transmitting registration mark is formed and with image reading system A located at the top thereof.

Figure 19:
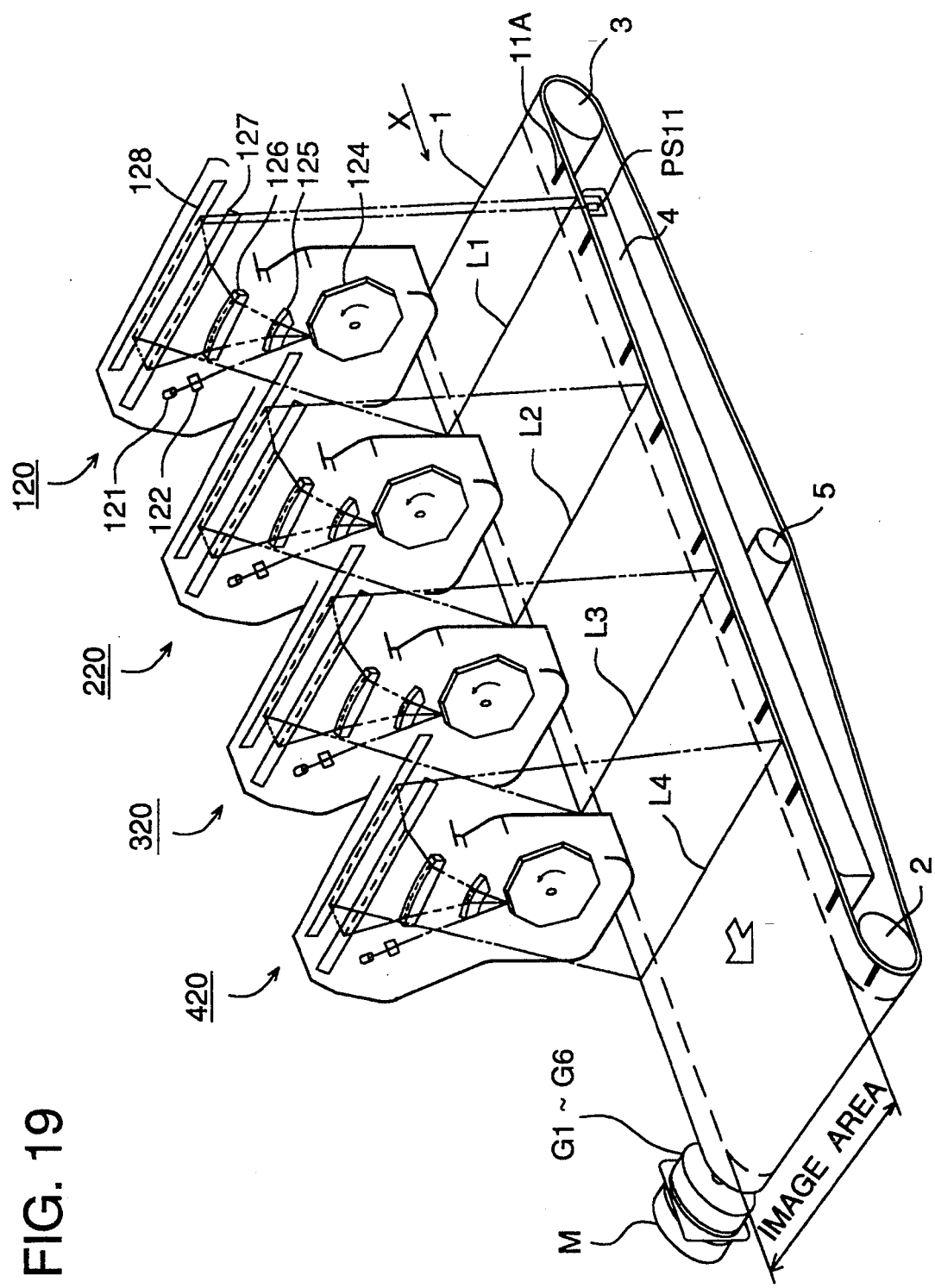
FIG. 19 is a perspective view of a laser scanning exposure unit in the tenth example mentioned above.

FIG. 19 is a perspective view showing the photoreceptor belt 11 and an optical path of the laser scanning exposure unit. Incidentally, portions in the figure having the same functions as those in the previous example are given the same symbols. Points different from the previous example will be explained as follows.

Light-transmitting registration mark 11A is formed at mostly the same place as the aforementioned registration mark 1A in the vicinity of the side end of a non-image area on the photoreceptor belt 11 in the manner that the registration mark 11A may transmit light. On the other hand, the guide member 4 mentioned above is provided with a recess at the place where the registration mark 11A and each primary scanning line L1 fall in line and cross each other and photosensor PS11 is affixed in the recess as a photo-detection means. The photosensors PS11-PS14 detect a laser beam for exposure scanning emitted from exposure unit 120 which is transmitted through the light-transmitting registration mark 11A, and generates signals for the reference position in the secondary scanning direction for determining the position of secondary scanning of L2-L4 for the nest process.

As described in the ninth and tenth examples explained above, laser scanning exposure units 120, 220, 320 and 420 are arranged first in an ordinary mechanical accuracy, then focusing of a laser beam is adjusted, and even when the conveyance speed of the rotating photoreceptor belt 1 or 11 may be changed during image writing, setting of a reference position and a predetermined counting can be conducted by detecting registration marks 1A and 11A with a sensor for each secondary scanning line. Thus, fine adjustment is conducted an delicate color slip in the order of width of one scanning or of width of one dot may be compensated extremely accurately for image forming. Especially in the case of color image forming wherein images are superimposed, excellent effect is shown for the remarkable improvement in quality of color images.

Next, eleventh through fifteenth examples of the invention will be explained as follows, referring to FIGS. 1 and 4 as well as FIGS. 20–26 attached hereto.

The foregoing is the process in the primary scanning direction for color image forming in the image forming apparatus having the constitution shown in FIG. 1.

With regard to the secondary scanning direction, on the other hand, registration mark 1B corresponding to the specific position on the photoreceptor belt 1 is detected by a photosensor, and based on the detected signals, modulation of semiconductor laser 121 by means of image signals is started and a primary scanning line in the secondary scanning direction is determined. although the details thereof will be stated later. After the start of scanning, the fixed position in the primary scanning direction is determined by a laser beam of the first semiconductor laser 121, modulation of semiconductor laser 121 by means of the first color image signals is started based on the detected signals, and modulated laser beam scans the surface of the photoreceptor belt 1. Therefore, the primary scanning by means of a laser beam and the secondary scanning by means of conveyance of the photoreceptor belt 1 form a latent image corresponding to the first color on the surface of the photoreceptor belt 1 charged uniformly. The latent image is then developed by the developing unit 130 containing therein yellow toner, and thereby a yellow toner image is formed on the surface of the photoreceptor belt 1. After that, the photoreceptor belt 1 is conveyed while it is holding thereon the yellow toner image, for entering the following image forming process for the second color.

Namely, the photoreceptor belt 1 on which a yellow toner image is formed advances to the position of the next charging unit 210 where it is charged by the charging unit 210 as in the case of image signals of the first color mentioned above. Then, the specific position on the photoreceptor belt 1 is detected by a laser beam of the second semiconductor laser, and modulation of semiconductor laser of laser scanning exposure unit 220 by means of the second image signals is started with the detected signals as a base. A laser beam generated from semiconductor laser is led, through a collimation lens, to a polygon mirror rotated by a driving motor for rotating scanning and then projected onto the surface of the photoreceptor belt 1 charged uniformly to a predetermined charge by the charging unit 210, through an fθ lens and a cylindrical lens, thus a latent image is formed on the photoreceptor belt 1. The latent image is then developed by developing unit 230 containing therein magenta toner as a second color. A magenta toner image is formed so that it is superimposed on the yellow toner image which has already been formed. In the same way, a cyan toner image as a third color and further a black toner image are superimposed on the surface of the photoreceptor belt 1.

Next, compensation operation wherein registration mark 1A provided on the photoreceptor belt 1 in the invention is used for detecting for compensation the deviation of a laser beam in the primary scanning direction will be explained.

Figure 20:
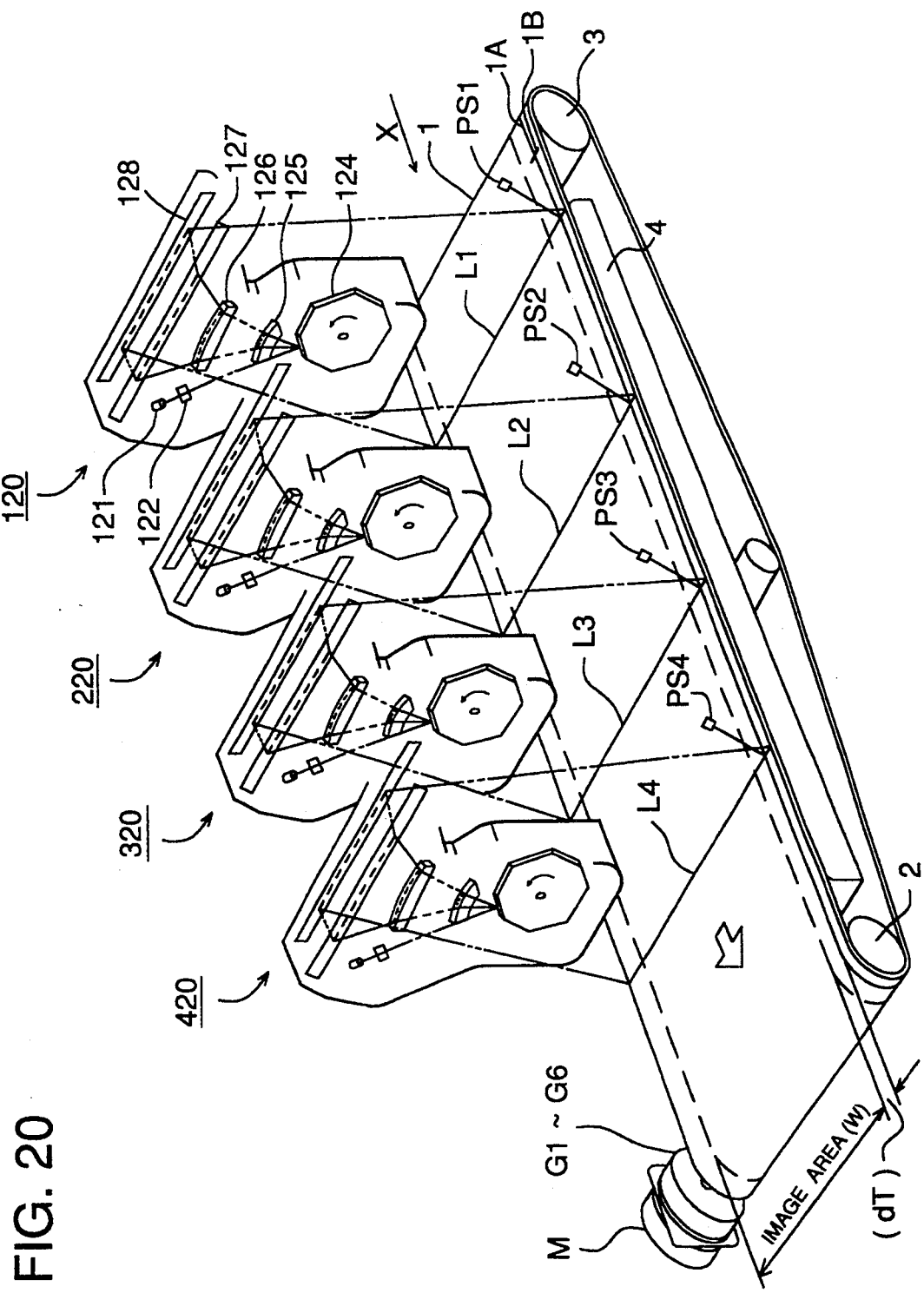
FIG. 20 is a perspective view showing the eleventh example of a laser scanning exposure unit in a color image forming apparatus of the invention.

As shown in FIG. 20, straight-shaped registration mark 1A of the invention formed in advance by means of printing or the lake is provided almost in parallel with the aforementioned side end in the vicinity of side end that is out of an image area on the photoreceptive surface of photoreceptor belt 1. The registration mark 1A is a reference for determining the start of exposure by means of a laser beam in the primary scanning direction and in the secondary scanning direction and a reference for detecting deviations in the primary scanning direction of exposure primary scanning lines L1, L2, l3 and L4.

Each of photosensors PS1, PS2, PS3 and PS4 is affixed at the position which is located over the point where the registration mark 1A and each of the primary scanning lines L1, L2, L3 and L4 agree in terms of position each other, and the reflected light from the registration mark 1A by means of a beam of primary scanning writing system is received by each of the photosensors. PS1, PS2, PS3 and PS4.

It is therefore preferable that the registration mark 1A has a color which is highly reflective against a laser beam. Further, each of photosensors PS1, PS2, PS3 and PS4 has a light-receiving area that is relatively broad so that it may receive the reflected light even when the position thereof is deviated to a certain extent.

Figure 21:
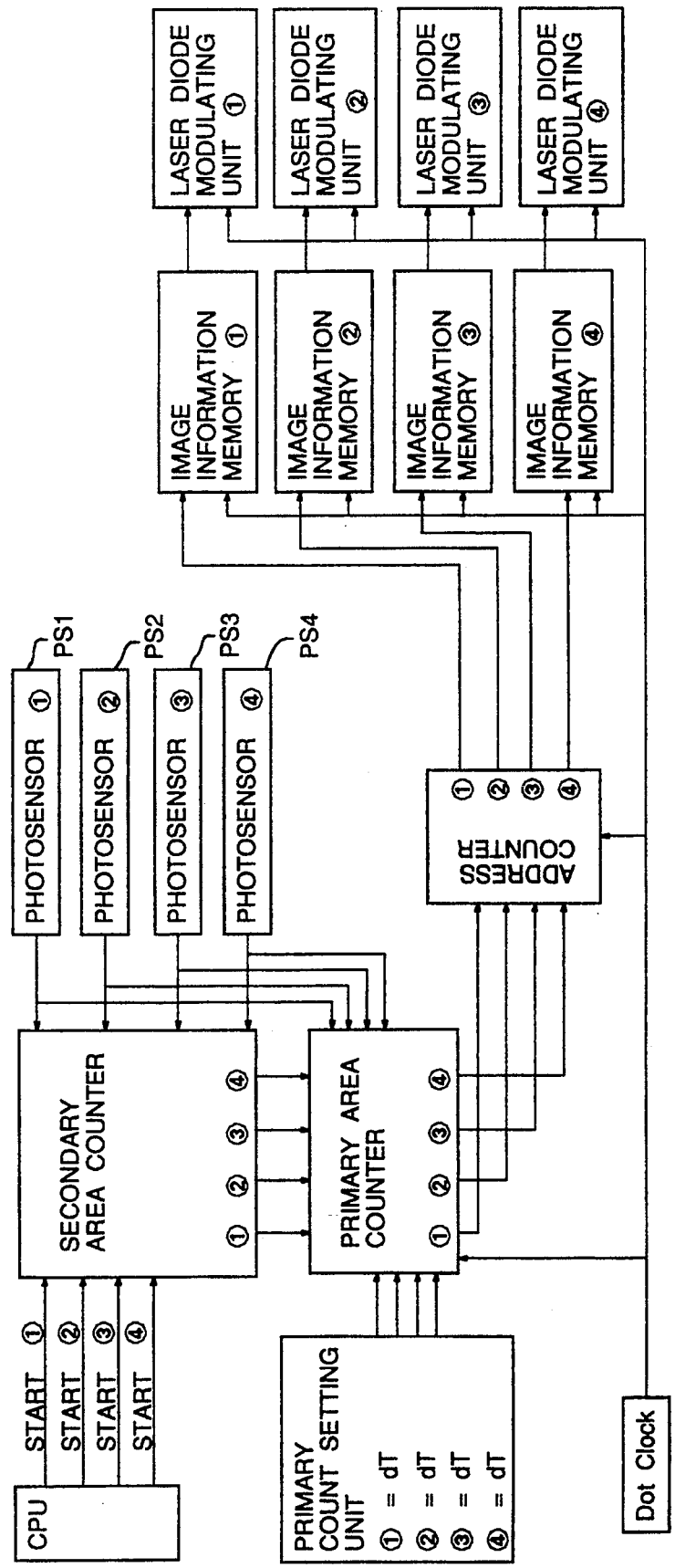
FIG. 21 is a control block diagram of the above-mentioned laser scanning exposure unit.

FIG. 21 is a block diagram of a scanning exposure compensation that prevents deviation of a laser beam in the primary scanning directions. A secondary area counter, in this case, is a counter that deviates a secondary scanning direction, while, a primary area counter is a counter for moving the primary scanning direction, and a primary count setting unit is a unit to set timing from reference detection value of registration mark 1A to the start of image writing.

Each of a plurality of laser beams for writing (4 beams in the figure) irradiates the registration mark 1A on the photoreceptor belt 1 during scanning, and the reflected light therefrom is received by each of photosensors PS1, PS2, PS3 and PS4, and image writing is started after the lapse of a certain period of time dT from the generation of detection signals of the registration mark 1A mentioned above.

When D is defined as dot density (number of dots per one inch), Vp is linear speed of a photoreceptor belt (mm/sec), W is image area width (mm) and dot clock is defined as $C_T(H_Z)$, the following relations are satisfied.

Scanning time for one line; $T_1 = 25.4/(D \times V_p)$

Scanning time for width of image area; $T_w = W/(25.4/D \times C_T)$

Owing to the foregoing, even when a belt moves in a zigzag direction and thereby an image position on the first primary scanning line L1 deviates from that on the second primary scanning line L2, the distance between the registration mark 1A and the image position remains the same and the registration mark 1A is the reference signal commonly for reference signals for image writing in the primary scanning direction. Therefore, positional deviation between the first image and the second image is not caused.

With regard to each light source of photosensors PS1, PS2, PS3 and PS4 in terms of availability of detection signals, there is no problem even when positions of writing units are deviated from the established positions to a certain extent, a laser beam it self used for writing of each image is employed.

To be concrete, under the condition that an exclusive photocoupler is used as in the past for detection of a registration mark, when the position of irradiation by means of a light source is deviated from that by means of an actual laser beam for writing, the zigzag movement of the belt within a range of the deviation can not be compensated.

Incidentally, the conventional exclusive photocoupler cited in this case needs to be one wherein receiving positions can be identified at a photoreceptive side (for example, a photocoupler wherein a linear image sensor, PSD or CCD all capable of being identified in position are used at a photoreceptive side), and the invention does not need such an expensive photoreceptive element.

Working of a color image forming apparatus in the present example will be explained as follows, referring to FIGS. 1, 20 and 21.

After the power supply, photoreceptor belt 1 is conveyed in the secondary scanning direction X by the two rotating rollers 2 and 3 which rotate clockwise at the constant speed that is one fifth of the constant linear speed for image forming and a laser is lit on each of laser scanning exposure units 120–420 for the start of scanning.

By utilizing that registration mark 1B corresponding to the specific position on the photoreceptor belt 1 moves in the secondary scanning direction X, the time required for the registration mark 1B to move along each distance between the primary scanning lines L1, L2, L3 and L4 is measured.

In the method for the measurement, a laser beam of the laser scanning exposure unit 120 irradiates the registration mark 1B and detection signals therefrom coming through the detection by means of photosensor PS1 are generated. During the period from the generation of the detection signals mentioned above to the moment when each of laser scanning exposure units 220, 320 and 420 irradiates the registration mark 1B and the reflected light therefrom is detected by each of photosensors PS2, PS3 and PS4, the number of occurrence that a laser beam of the laser scanning exposure unit 120 irradiates registration mark 1A and detection signals therefrom detected by the photosensor PS1 are generated is counted. After this, the process enters the state of standby.

During the operation of printing, the surface of the photoreceptor is charged uniformly by charging unit 110.while the photoreceptor belt 1 is being conveyed at the speed of image forming. By utilizing the laser beam used for exposure by means of the exposure unit 120 mentioned above, the registration mark 1A is detected by the photosensor PS1 and with the detection signals as a reference, imagewise exposure for one line L1 is conducted. Namely, laser scanning exposure unit 120 detects the deviation in the primary scanning direction on the photoreceptor belt 1 after the lapse of time set in advance from the detection of the registration mark 1A, and it compensates the deviation for modulating the laser beam, thus, imagewise exposure may be started constantly from the predetermined position on the photoreceptor belt 1.

After that, the laser scanning exposure unit 120 conducts exposure scanning based on yellow data equivalent to one image screen, and forms a latent image at a predetermined position on the photoreceptor belt 1. The latent image is developed by developing unit 130 with yellow toner.

For image forming following the foregoing based on magenta data, cyan data and black data, each of exposure units 220, 320 and 420 starts modulation after compensating the deviation to the secondary scanning direction by obtaining detection signals of the registration mark 1A utilizing a laser beam from each exposure unit on the photoreceptor belt 1 and by using the detection signals as a reference, after the lapse of the predetermined time, thus, imagewise exposure may be started constantly from a predetermined position on the photoreceptor belt 1. The compensation of the deviation to the secondary scanning direction is conducted by starting the imagewise exposure after counting the time required for the registration mark 1B to move along each distance between scanning lines divided by 1/5. This eliminates necessity for positioning a plurality of exposure units in high mechanical accuracy, and prevents color slips by avoiding that the time for starting exposure for latent image formation is deviated when repeating latent image formation corresponding in quantity to the number of colors used for image forming.

Incidentally, it is preferable that adjustment of primary scanning width (adjustment of dot clock) is conducted before detection of compensation value for the deviation to the secondary scanning direction that precedes the standby slate.

FIG. 4 shows a general structural diagram of a color copying machine equipped, as the twelfth example of the invention, with photoreceptor belt 11 on which a light-transmitting registration mark is formed and with image reading system A located at the top thereof.

Figure 22:
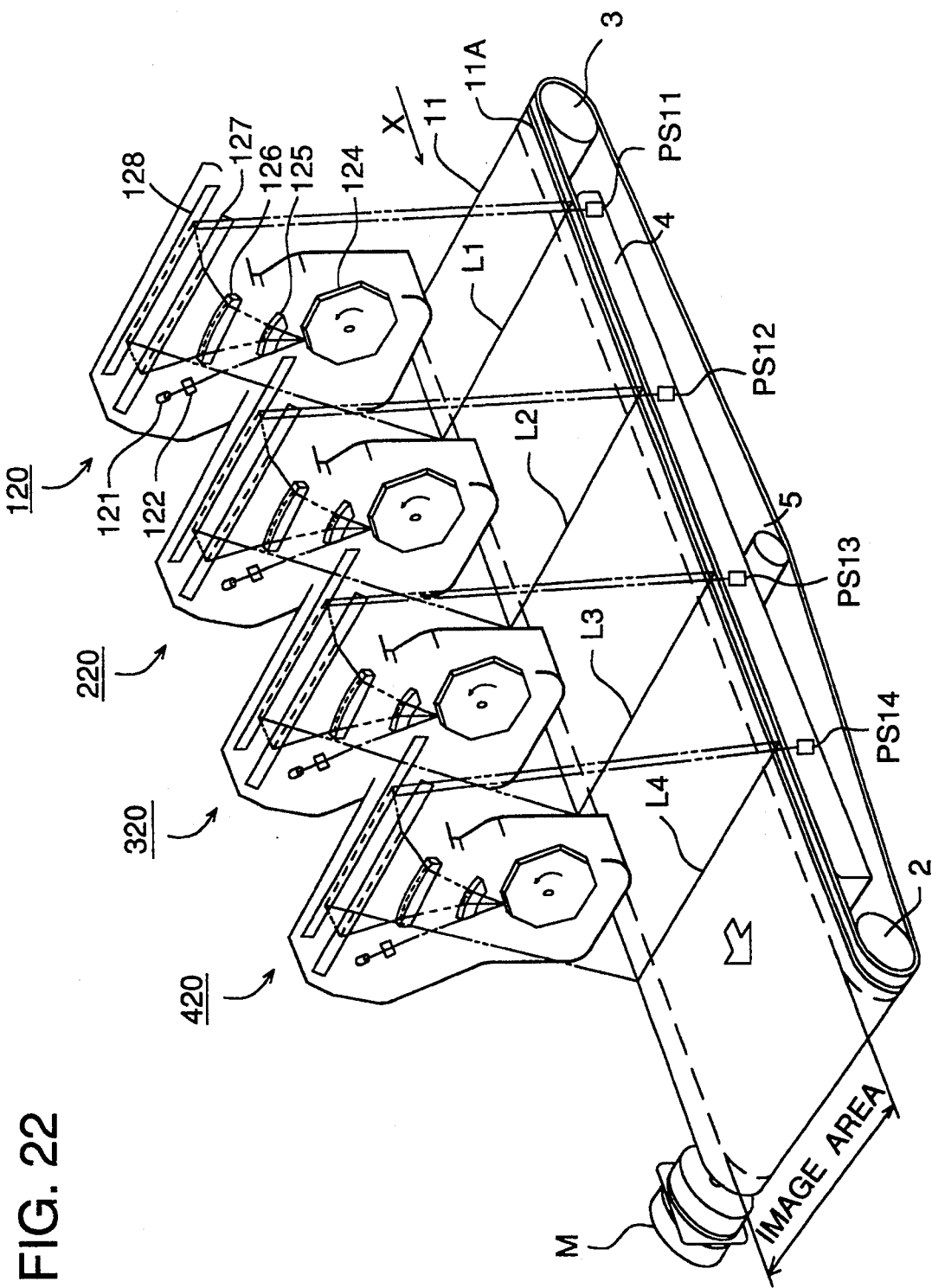
FIG. 22 is a perspective view of the twelfth example of a laser scanning exposure unit.

FIG. 22 is a perspective view showing the photoreceptor belt 11 and an optical path of the laser scanning exposure unit. Incidentally, portions in the figure having the same functions as those in the previous example are given the same symbols. Points different from the previous example will be explained as follows.

Light-transmitting registration mark 11A is formed at mostly the same place as the aforementioned registration mark 1A in the vicinity of the side end of a non-image area on the photoreceptor belt 11 in the manner that the registration mark 11A may transmit light. On the other hand, the guide member 4 mentioned above is provided with a recess at the place where the registration mark and each of primary scanning lines L1, L2, L3 and L4 fall in line and cross each other and each of photosensors PS11, PS12, PS13 and PS14 is affixed in the recess as a photo-detection means. The photosensors PS11–PS14 detect a laser beam for exposure scanning emitted from laser scanning exposure unit 120 which is transmitted through the litht-transmitting registration mark 11A.

Figure 23:
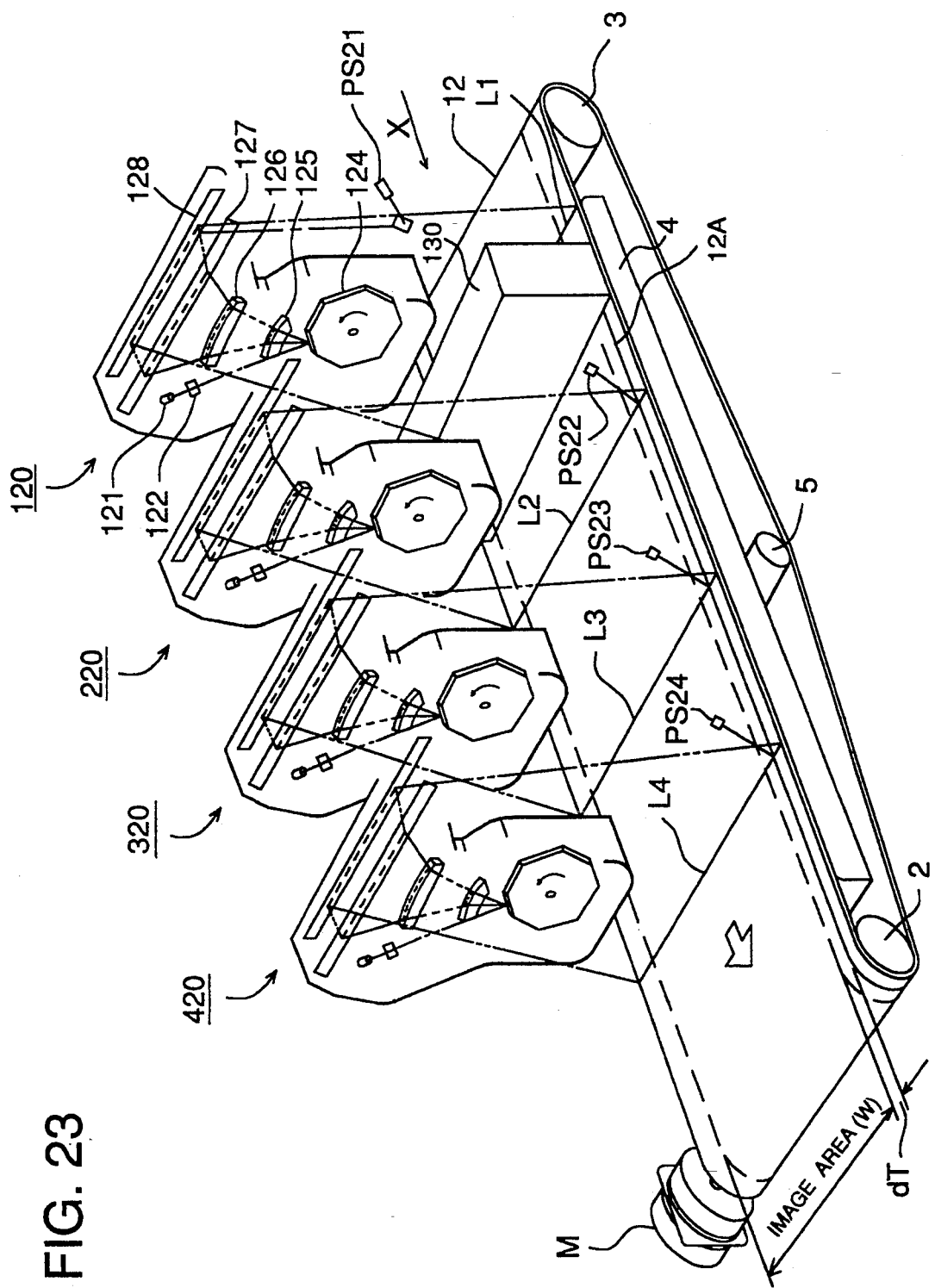
FIG. 23 is a perspective view of the thirteenth example of a laser scanning exposure unit in the invention.
Figure 24:
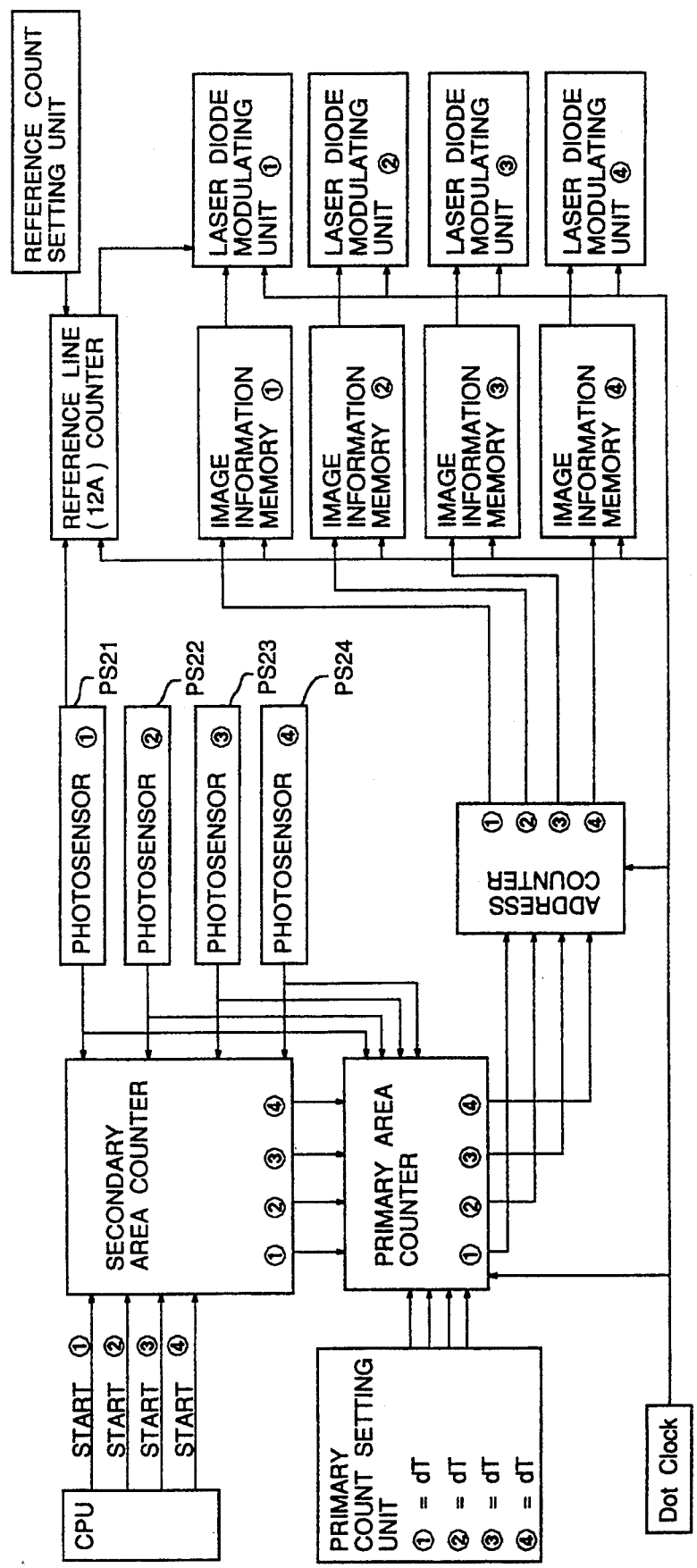
FIG. 24 is a control block diagram for the thirteenth example of a laser scanning exposure unit mentioned above.

Next, a color forming apparatus of the thirteenth example will be explained as follows. FIG. 23 represents a perspective view of a laser scanning exposure unit of the invention and FIG. 24 is a block diagram for primary scanning compensation that prevents deviation of a laser beam in the primary scanning direction. Incidentally, when symbols shown in the examples described below are the same as those shown in the eleventh example mentioned above, the symbols represent the same constitution and function as those in the eleventh example, unless otherwise specified.

A laser beam of the laser scanning exposure unit 120 forms a latent image of exposure primary scanning line L1 on the photoreceptor belt 12 charged in advance, and prior to this, latent images of development reference line 12A are formed in the vicinity of the side end of a non-image area. The latent images of the development reference line 12A are developed by the first developing unit 130 to be visible development reference line 12A. PS21 is a beam detector (photosensor) which receives the laser beam coming from rotating polygon mirror 124 through fθ lens 125 and generates output signals and further generates, by means of a beam detect detection circuit, beam detect signals in a shape of a square wave based on an arbitrary set value.

With regard to the development reference line 12A, a latent image thereof is started by the exposure to the laser beam after the period of time that is set, after the generation of beam detect signals, by a reference count setting unit.

A plurality of scanning exposure beams (usually 3 beams) located at downstream side from the primary scanning line L1 irradiate respectively the visualized development reference line 12A during scanning and each reflected light therefrom is received by each of photosensors PS22, PS23 and PS24. Thereby, the starting position in the primary scanning direction is detected and controlled.

Only one of the aforementioned development reference line 12A is provided on one side of the photoreceptor belt 12, and primary scanning line L2 starts writing after the lapse of a certain timing dT from the detection of the development reference line 12A, in the same manner as in the eleventh example. In the same way as the foregoing, primary scanning lines L3 and L4 write images on the photoreceptor belt 12 with a reference of detection signals of the visualized development reference line 12A.

Figure 25:
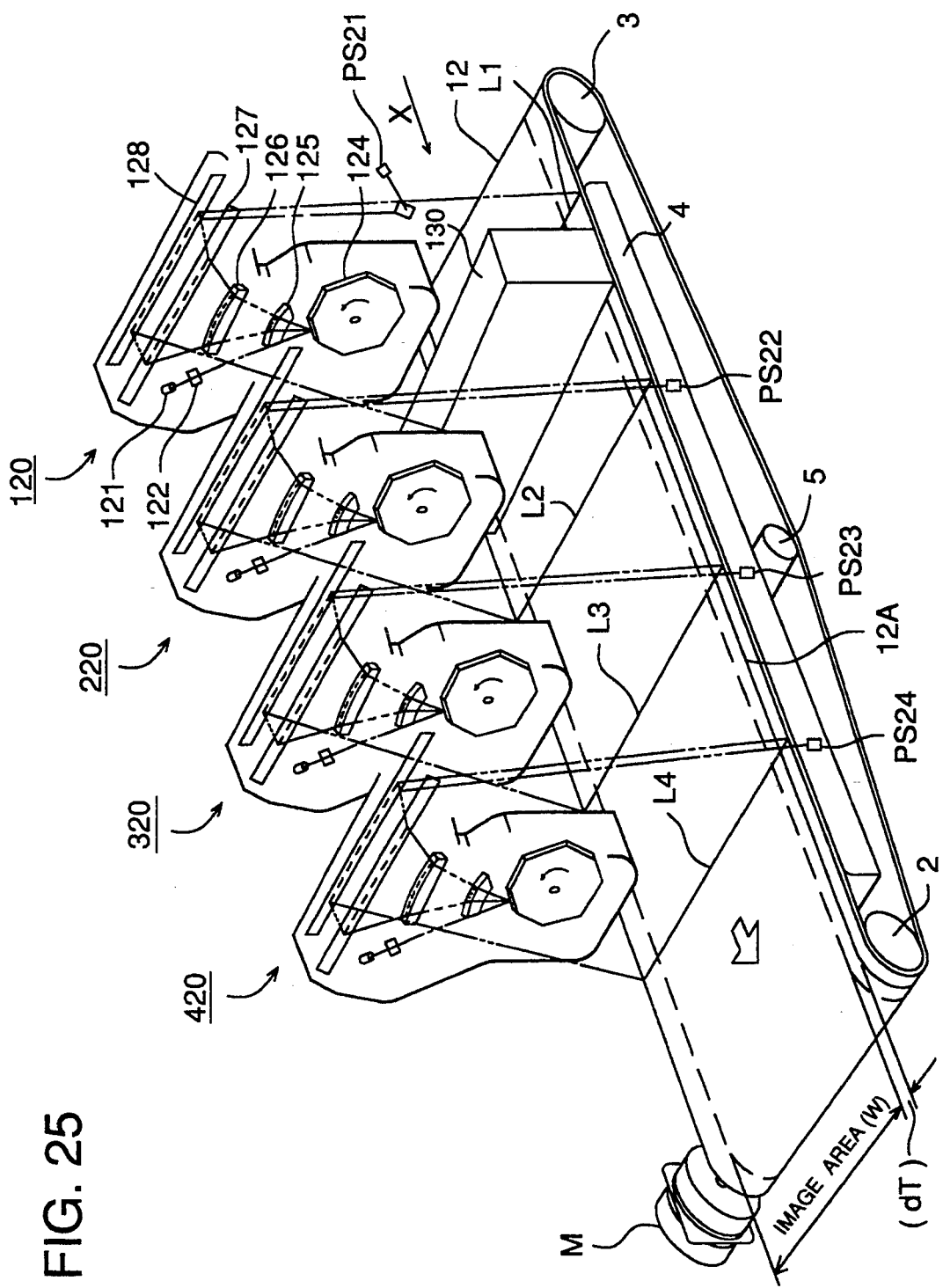
FIG. 25 is a perspective view of the fourteenth example of a laser scanning exposure unit in the invention.

FIG. 25 shows a color image forming apparatus of the fourteenth example.

In this example, a support in the vicinity of a position of the development reference line 12A provided at the end side of a non-image area on the photoreceptor belt 12 is made to be a transparent zone, and developing unit 130 corresponding, in terms of position, to the extremely upstream position of the transparent zone, namely to the first primary scanning beam L1 contains developer whose toner can transmit a primary scanning laser beam. The development reference line (developed pattern) 12A visualized by the developing unit 130 is irradiated by primary scanning beam L2 and transmits the beam, and the transmitted light is detected by photosensor PS22 so that the detection signal may become a base in the primary scanning direction for image signals after predetermined period of time dT, in the same manner as in the previous thirteenth example.

Primary scanning lines L3 and L4 also write images in the same way based on the detection signals of the visualized development reference line 12A mentioned above.

Figure 26:
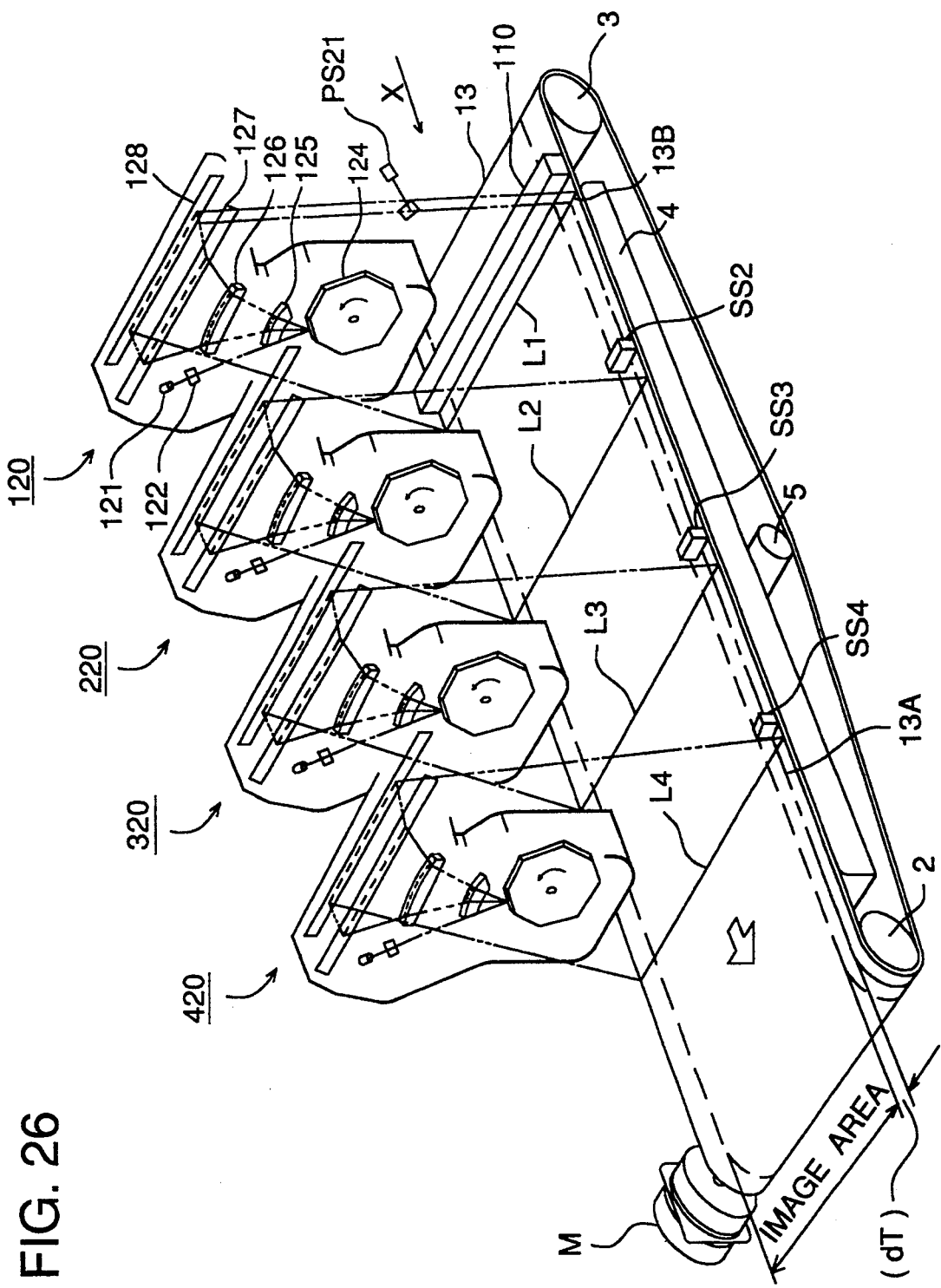
FIG. 26 is a perspective view of the fifteenth example of a laser scanning exposure unit in the invention.

FIG. 26 is a perspective view of an exposure unit showing the fifteenth example of the invention.

Primary scanning line L1 forms line-shaped latent image 13B at a predetermined position on a non-image area of the photoreceptor belt 13 that is charged entirely by charging unit 110 in advance. The formation of the latent image 13B causes a change in surface potential on the photoreceptor belt 13.

Line-shaped latent image pattern 13A is formed on the photoreceptor belt 13 by the movement of the photoreceptor belt 13 in the secondary scanning direction X.

Surface potential sensors SS2, SS3 and SS4 are affixed so that each of them may be positioned at the upstream side of each of primary scanning beams L2, L3 and L4 in the moving direction of the aforementioned latent image pattern 13A. When the secondary scanning movement (in X direction) of the photoreceptor belt 13 makes the latent image pattern 13A to pass through the surface potential sensor SS2 located immediately ahead of the second primary scanning beam L2, potential variation on the latent image pattern 13A is detected by the surface potential sensor SS2, registration mark position signals are generated, and writing of the second image is started after the lapse of a certain period of time dT. With regard to primary scanning lines L3 and L4, image writing is conducted after the reference position of the latent image pattern 13A is detected by each of surface potential sensors SS3 and SS4, which is the same as the foregoing.

As described in the eleventh through fifteenth examples explained above, laser scanning exposure units 120, 220, 320 and 420 are arranged first in an ordinary mechanical accuracy, then focusing of a laser beam is adjusted, and even when the photoreceptor belt rotating during image writing operation moves in a zigzag direction or moves in the thrust direction, a sensor detects registration marks 1A and 11A or development reference line 12A or latent image pattern 13A. Thus, fine adjustment is conducted an delicate color slip in the order of width of one scanning or of width of one dot may be compensated extremely accurately for image forming. Especially in the case of color image forming wherein images are superimposed, excellent effect is shown for the remarkable improvement in quality of color images.

As explained above, owing to a laser writing unit in a color image forming apparatus of the invention, registration in the primary scanning direction for dots having different colors respectively which is one of the most important factors influencing recorded image quality can be realized in a simple and highly accurate way during color image forming, resulting in an excellent effect that color slips may be prevented and thereby images in high quality may be formed. In particular, the invention provides extremely effective means in an exposure writing unit used for a color image forming apparatus wherein images are superimposed such as those including an apparatus of an electrophotographic system.

What is claimed is:

1. A color image forming apparatus comprising:
   moving means for moving an image carrier in a secondary direction perpendicular to a primary direction;
   first charging means for charging said image carrier;
   first imagewise exposure means for scanning said image carrier with a light beam in said primary direction to form a first latent image thereon;
   first developing means for developing said first latent image to form a first toner image on said image carrier;
   second charging means for charging said image carrier having said first toner image registered thereon;
   second imagewise exposure means for scanning said image carrier with a light beam in said primary direction to form a second latent image on said image carrier having said first toner image registered thereon;

second developing means for developing said second latent image to form a second toner image on said image carrier having said first toner image registered thereon;

a registration mark provided on a non-image forming area of said image carrier;

first detecting sensor for detecting said registration mark using said light beam of said first imagewise exposure means and sending a first detecting signal;

second detecting sensor for detecting said registration mark using said light beam of said second imagewise exposure means and sending a second detecting signal; and controlling means for controlling timing of said first and second imagewise exposure means and movement of said image carrier in response to said first detecting signal and said second detecting signal.

2. The apparatus of claim 1 wherein said first and second imagewise exposure means comprise a laser beam scanning exposure means.

3. The apparatus of claim 1 wherein said image carrier comprises an endless belt type of image carrier.

4. The apparatus of claim 1 wherein said registration mark is a light-reflective mark.

5. The apparatus of claim 4 wherein said first and second detecting sensor detect the reflecting light from said light-reflective mark.

6. The apparatus of claim 1 wherein said registration mark is a developed toner mark formed by said first charging means, said first imagewise exposure means, and first developing means.

* * * * *

UNITED STATES PATENT AND TRADEMARK OFFICE
CERTIFICATE OF CORRECTION

PATENT NO. : 5,381,167
DATED : January 10, 1995
INVENTOR(S) : Yozo FUJII et al

It is certified that error appears in the above-indentified patent and that said Letters Patent is hereby corrected as shown below:

Abstract, line 9, after "responding" insert --to--.

Abstract, line 11, change "trough" to --through--.

*Abstract, line 24, change "The" to --And the--.

*Attorney, Agent, or Firm, after "Henderson" insert --,--.

Signed and Sealed this

Sixth Day of June, 1995

BRUCE LEHMAN

Attest:

Attesting Officer

Commissioner of Patents and Trademarks